US010259391B2

(12) United States Patent
Sakai et al.

(10) Patent No.: US 10,259,391 B2
(45) Date of Patent: Apr. 16, 2019

(54) SIDE MIRROR DEVICE

(71) Applicant: HONDA MOTOR CO., LTD., Tokyo (JP)

(72) Inventors: Tomoaki Sakai, Shimotsuke (JP); Takeshi Ishikawa, Utsunomiya (JP); Jun Nakamura, Shimotsuke (JP); Makoto Sawada, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/518,294

(22) PCT Filed: Oct. 14, 2015

(86) PCT No.: PCT/JP2015/079027
§ 371 (c)(1),
(2) Date: Apr. 11, 2017

(87) PCT Pub. No.: WO2016/060160
PCT Pub. Date: Apr. 21, 2016

(65) Prior Publication Data
US 2017/0305350 A1    Oct. 26, 2017

(30) Foreign Application Priority Data

Oct. 16, 2014  (JP) .................................. 2014-211780

(51) Int. Cl.
*B60R 1/06* (2006.01)
*B60R 1/00* (2006.01)
(Continued)

(52) U.S. Cl.
CPC .................. *B60R 1/06* (2013.01); *B60R 1/00* (2013.01); *B60R 1/0617* (2013.01); *B60R 1/074* (2013.01); *B60R 1/076* (2013.01)

(58) Field of Classification Search
CPC ........... B60R 1/06; B60R 1/00; B60R 1/0617; G02B 7/182
(Continued)

(56) References Cited

U.S. PATENT DOCUMENTS 9,022,588 B2 *  5/2015  Chino ..................... B60R 1/072
                                            359/871
2004/0246607 A1 * 12/2004  Watson .................... B60R 1/12
                                            359/872
(Continued)

FOREIGN PATENT DOCUMENTS

CN          1706689 A    12/2005
CN        103448620 A    12/2013
(Continued)

OTHER PUBLICATIONS

Machine translation of DE 3008031-A1 from WIPO website (https://patentscope.wipo.int/search/en/detail.jsf?docId=DE102247257&tab=NATIONALBIBLIO&maxRec=1000), performed on Nov. 28, 2018.*
(Continued)

*Primary Examiner* — Frank G Font
(74) *Attorney, Agent, or Firm* — Westerman, Hattori, Daniels & Adrian, LLP

(57) ABSTRACT

This side mirror device includes: a mirror base; a housing a bearing mechanism; a mirror; an inclining mechanism; an internal housing; and a cover, wherein the bearing mechanism and the inclining mechanism are contained in an interior of the housing, and wherein the bearing mechanism and the inclining mechanism are formed so as to face each other across the mirror base along an axis line of the bearing mechanism, wherein the housing has an upper cover and a lower cover that are disposed so as to face each other, wherein the upper cover and the lower cover whose outer surface shapes form an mirror-image symmetry with each other, wherein the cover forms, on a rear side, an opening
(Continued)

edge portion that exposes the mirror, wherein the opening edge portion is made of an involuted recess portion that is a rear-side end portion of the cover being bent inwardly toward the mirror, and wherein with the rear-side end portion of the internal housing is inserted into the involuted recess portion, the rear-side end portion of the cover is engaged with the rear-side end portion of the internal housing.

10 Claims, 15 Drawing Sheets

(51) Int. Cl.
  *B60R 1/074* (2006.01)
  *B60R 1/076* (2006.01)

(58) Field of Classification Search
  USPC .................................. 359/841, 871; 296/1.11
  See application file for complete search history.

(56) References Cited

U.S. PATENT DOCUMENTS

| | | | | |
|---|---|---|---|---|
| 2009/0086347 A1* | 4/2009 | Kawamura | ............... | B60R 1/06 359/841 |
| 2011/0007411 A1* | 1/2011 | Uematsu | .................. | B60J 1/10 359/862 |
| 2016/0202427 A1* | 7/2016 | Smith | .................. | G02B 6/3604 385/26 |

FOREIGN PATENT DOCUMENTS

| | | | | |
|---|---|---|---|---|
| DE | 3008031 A1 * | 9/1981 | ............... | B60R 1/06 |
| EP | 0367134 A1 | 5/1990 | | |
| EP | 1481850 A1 | 12/2004 | | |
| EP | 2644453 A1 | 10/2013 | | |
| JP | 52-18556 Y2 | 4/1977 | | |
| JP | 53-39655 B | 10/1978 | | |
| JP | 58-163333 U1 | 10/1983 | | |
| JP | 60-148739 A | 8/1985 | | |
| JP | 60-185651 A | 9/1985 | | |
| JP | 63-70447 U1 | 5/1988 | | |
| JP | 64-63434 A | 3/1989 | | |
| JP | 4-101746 U1 | 9/1992 | | |
| JP | 10-217854 A | 8/1998 | | |
| JP | 2010-537883 A | 12/2010 | | |
| JP | 4673913 | 4/2011 | | |
| JP | 2011-173572 A | 9/2011 | | |
| JP | 4985276 | 7/2012 | | |
| WO | 2009/029978 A1 | 3/2009 | | |

OTHER PUBLICATIONS

International Search Report dated Jan. 19, 2016, issued in counterpart International Application No. PCT/JP2015/079027 (3 pages).
Japanese Office Action dated Jul. 5, 2016, issued in counterpart Japanese Patent Application No. 2014-211779 w/English Translation (6 pages).
Japanes Office Action dated Jul. 5, 2016, issued in counterpart Japanese Patent Application No. JP 2014-211780 w/English Translation (8 pages).
Japanese Office Action dated Dec. 13, 2016, issued in counterpart Patent Application No. 2014-211780 w/English Translation (8 pages).
Office Action dated Aug. 3, 2018, issued in counterpart Chinese Application No. 201580055350.0, with English translation of Search Report. (9 pages).
Extended (supplementary) European Search Report dated Sep. 28, 2018, issued in counterpart European Application No. 15850073.6. (8 pages).

* cited by examiner

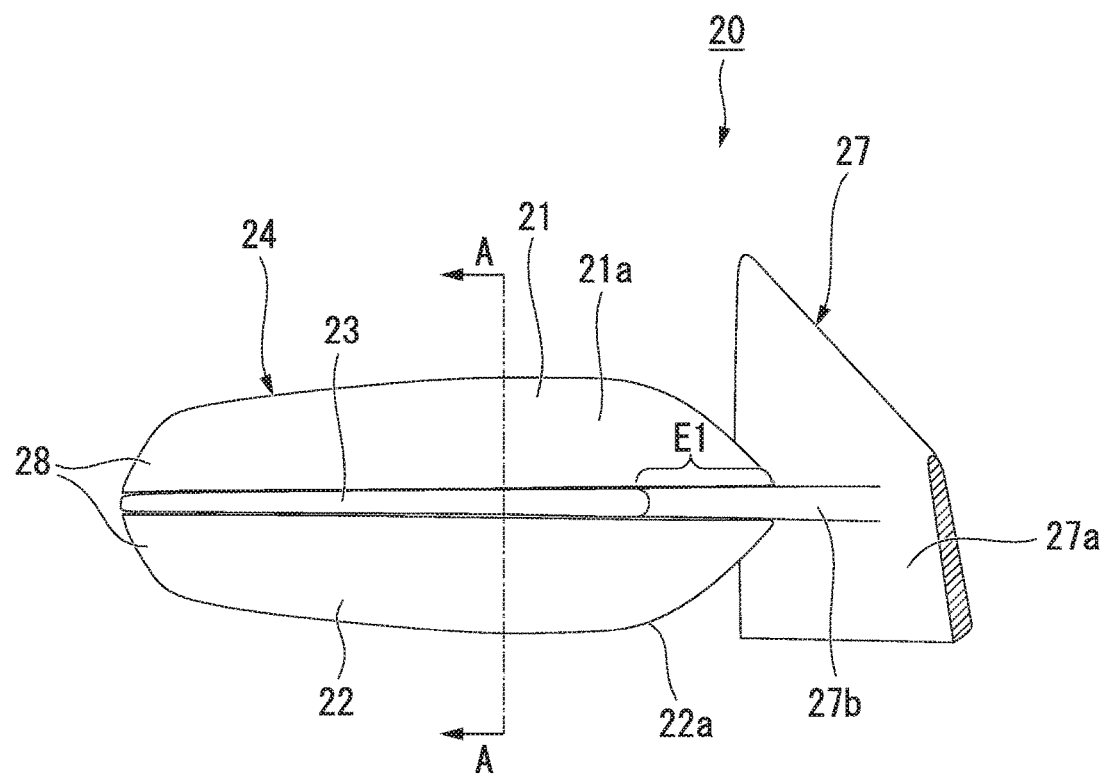
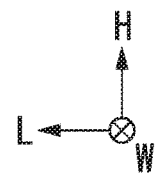

FIG. 15
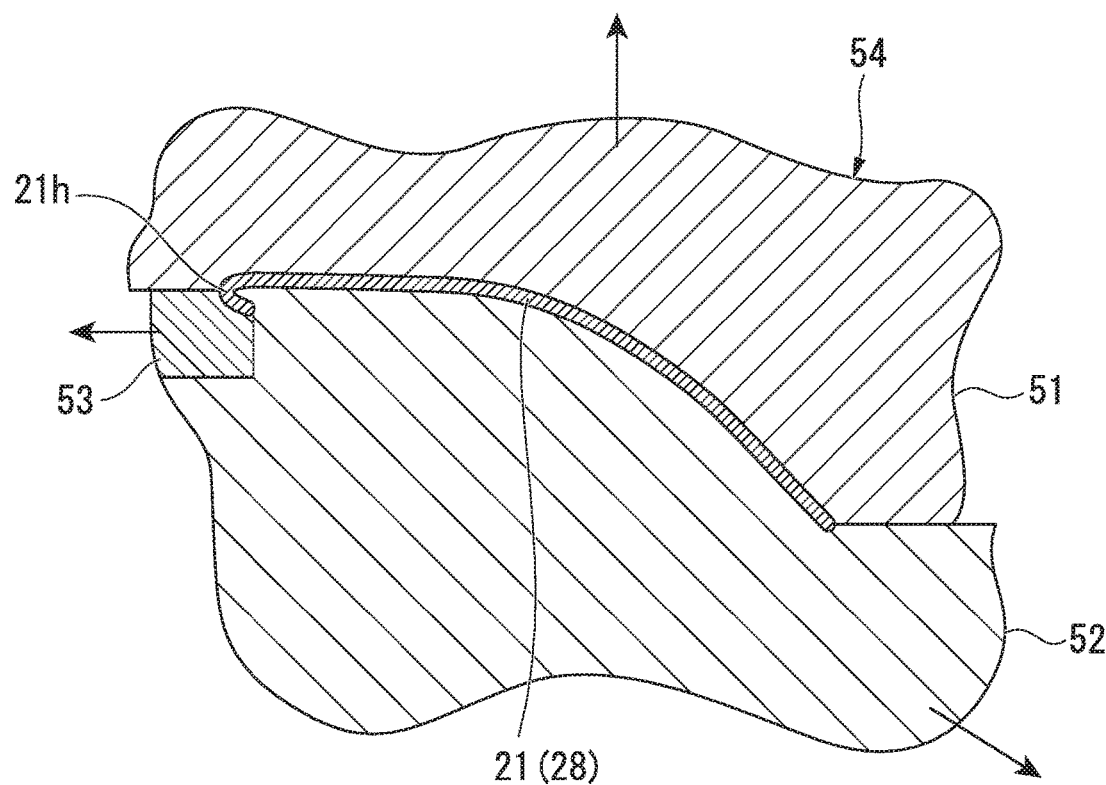
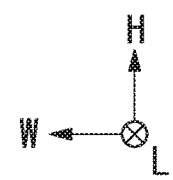

SIDE MIRROR DEVICE

TECHNICAL FIELD

The present invention relates to a side mirror device of a vehicle.

The present application claims priority based on Japanese Patent Application No. 2014-211778 filed on Oct. 16, 2014, on Japanese Patent Application No. 2014-211779 filed on Oct. 16, 2014, and on Japanese Patent Application No. 2014-211780 filed on Oct. 16, 2014, the contents of which are incorporated herein by reference.

BACKGROUND ART

On both sides of a vehicle in the vehicular width direction, there are provided side mirror devices for checking a rear view. As a general structure, each of these side mirror devices includes: a mirror one surface of which forms a reflecting surface; a housing (internal housing) that supports the mirror, a cover that covers an outer side of the internal housing; and a mirror base that protrudes outwardly from a side surface of a vehicle and pivotably supports the housing.

Many of the side mirror devices include a bearing mechanism that makes the housing pivotable between a use position, in which the mirror faces to the rear side in the travelling direction of the vehicle, and a retraction position in which the mirror faces to the side surface of the vehicle. Furthermore, the side mirror device includes an inclining mechanism that, when an excessive stress toward the vehicular rear direction is applied to the housing in the use position, allows the housing to pivot into the retraction position.

There is disclosed an outside mirror device for a vehicle in which a shaft is extended upwardly from a mirror base, and in which the shaft is provided with: an attachment portion (bearing mechanism) for a mirror housing; and a shaft holder and a spring that make up an inclining mechanism (for example, see Patent Document 1).

In consideration of a flow of air at the time when the vehicle is travelling, the housing has a shape that extends in the up-down direction from the front side to the rear side. In general, the housing is formed by molding by used of resin or the like. For easiness of molding and assembly, the housing is made by combining members that are divided into two or more.

There is disclosed a side mirror device that is made of an upper housing member and a lower housing member being attached to a front portion of a visor. In this side mirror device, an upper housing member and a lower housing member whose shapes are different from each other are combined to form a housing of the side mirror device (for example, see Patent Document 2).

As for a mirror (side mirror device), there is disclosed a structure in which an evoluted recess portion that is an end portion of a visor rim (internal housing) being bent outwardly, is formed, and in which into this evoluted recess portion, a circumferential edge portion of a visor cover (cover) is inserted (for example, see Patent Document 3).

RELATED ART DOCUMENT

Patent Document

Patent Document 1: Japanese Patent No. 4985276
Patent Document 2: Japanese Patent No. 4673913
Patent Document 3: Japanese Unexamined Utility Model Application, First Publication No. S63-70447

SUMMARY

Problems to be Solved by the Invention

In the structure in which the mirror base engages the lower portion of the housing as is the case with the outside mirror device for a vehicle shown in Patent Document 1, there is sufficient room in the space, in the interior of the housing, on the side upper than the engagement portion with the mirror base. Therefore, it is possible to form a bearing mechanism and an inclining mechanism on the side upper than the mirror base.

However, in the side mirror device with a structure in which the mirror base is engaged with a vicinity of the middle of the housing in the up-down direction, it is difficult to secure sufficient space, in the interior of the housing, on the upper side of the mirror base. Therefore, it is difficult to form a bearing mechanism and an inclining mechanism on the upper side of the mirror base, which poses a problem of severe restriction in term of layout.

A first aspect of the present invention has been achieved in view of this problem, and provides a side mirror device that improves the freedom of the housing shape and that is downsizable even if the side mirror device has a structure in which a mirror base is engaged with the vicinity of the middle position of the housing in the up-down direction.

In the side mirror device as show in Patent Document 2, the upper housing member and the lower housing member have shapes different from each other. Therefore, in order to manufacture side mirror devices that are suitable respectively for a right side surface and a left side surface of a vehicle in a vehicular width direction, it is necessary to prepare four shape types of housing constituent elements, namely, an upper housing member and a lower housing member on the right surface side, and an upper housing member and a lower housing member on the left surface side, which are in mirror-image symmetry with the former pair. Furthermore, in order to manufacture four shape types of housing constituent elements, four shape types of molds are required as well. This makes the assembly steps of the side mirror device complicated, which prevents reduction in manufacturing costs.

Furthermore, because the upper housing member and the lower housing member are different in shape, a difference in flow speed is produced, when a vehicle is traveling, between air flowing along an outer surface on the upper housing member side and air flowing along an outer surface on the lower housing member side. With this difference in flow speed of air, a turbulent flow is produced behind the housing of the side mirror device. This is a cause of an increase in aerodynamic drag and is also a cause of production of unpleasant wind noise.

A second aspect of the present invention has been achieved in view of this problem, and provides a side mirror device that is easy to manufacture and assemble and that is excellent in aerodynamic character.

In the mirror shown in Patent Document 3, the edge of the visor rim is located on the outer surface of the mirror. Consequently, the butt portion (the engagement portion) between the visor cover and the visor rim is inevitably exposed to the outer surface of the mirror. This results in a poor sense of integratedness in appearance. Therefore, further improvement in design is desired. Furthermore, there is also a problem in that a step or a groove, which is formed in the butt portion between the visor cover and the visor rim and which is exposed to the outer surface, produces turbulence when the vehicle is travelling, making it likely to produce unpleasant wind noise.

A third aspect of the present invention has been achieved in view of these problems, and provides a side mirror device that is capable of offering a sense of integratedness in appearance and that is capable of suppressing the production of turbulence when the vehicle is travelling.

Means for Solving the Problem

To solve the aforementioned problems and achieve the objects, the present invention adopts the following aspects.

(1) A side mirror device according to a first aspect of the present invention includes: a mirror base that extends from a side surface of a vehicle toward an outside; a housing that is pivotably attached to the mirror base; a bearing mechanism that pivotably engages the housing with the mirror base; a mirror that is contained in the housing; and an inclining mechanism that, in a use position in which the mirror is directed to a rear side in a travelling direction of the vehicle, pivots the housing toward a retraction position in which the mirror faces the side surface of the vehicle, when a stress with a value above a preset value is applied to the housing, wherein the bearing mechanism and the inclining mechanism are contained in an interior of the housing, and wherein the bearing mechanism and the inclining mechanism are formed so as to face each other across the mirror base along an axis line of the bearing mechanism.

(2) In the side mirror device as set forth above in (1), the bearing mechanism may have: an inner cylindrical portion that protrudes upwardly from the mirror base along the axis line of the bearing mechanism; and an outer cylindrical portion that is formed in the housing and covers the inner cylindrical portion.

(3) In the side mirror device as set forth above in (1) or (2), at least a part of an upper surface of the inner cylindrical portion and a part of an inner surface of the outer cylindrical portion may be formed so as to overlap each other.

(4) The side mirror device as set forth above in any one of (1) to (3) may further include a harness that is led into the housing from the vehicle for controlling a side mirror device, wherein the harness is formed on a side of the axis line of the bearing mechanism on which the inclining mechanism is formed.

(5) In the side mirror device as set forth above in (4), the inclining mechanism may include: an engagement member that engages the mirror base; a spring that biases the engagement member toward the mirror base; and a spring shaft that extends along the axis line of the bearing mechanism and is inserted into the spring, and wherein the harness may be provided beneath the spring shaft.

(6) In the side mirror device as set forth above in any one of (1) to (5), the mirror base may be disposed in a vicinity of a center of the housing along an up-down direction.

(7) In the side mirror device as set forth above in (6), a front end wall of the housing along the travelling direction may be formed in inclined surfaces that are inclined obliquely upwardly and obliquely downwardly from a front side toward a rear side of the vehicle in the travelling direction.

(8) In the side mirror device as set forth above in (7), the mirror base may be made of a flat-plate-like member that expands in a substantially horizontal direction.

(9) A side mirror device according to a second aspect of the present invention includes: mirrors that are attached to outer surfaces on both sides of a vehicle along a vehicular width direction; housings that hold the mirrors; and mirror bases that couple the housings to the vehicle, wherein the housing has an upper cover and a lower cover that are disposed so as to face each other, and wherein shapes of outer surfaces of the upper cover and the lower cover form a mirror-image symmetry with each other.

(10) In the side mirror device as set forth above in (9), in the mirror base, an engagement region that is engaged with the housing may be disposed between the upper cover and the lower cover, and in the mirror base, the engagement region may directly face the upper cover and the lower cover.

(11) In the side mirror device as set forth above in (10), the outer surfaces of the upper cover and the lower cover may be formed in a shape that is further inclined toward a rear of the vehicle as it is farther away from the mirror base along an up-down direction of the vehicle.

(12) In the side mirror device as set forth above in any one of (9) to (11), between the upper cover and the lower cover, a center cover may be provided that outwardly extends continuously from the engagement region of the mirror base along the vehicular width direction; and the center cover may be sandwiched between the upper cover and the lower cover.

(13) In the side mirror device as set forth above in (12), the engagement region of the mirror base and the center cover may be formed at least in a connection portion therebetween so as to have a substantially same width along an up-down direction of the vehicle.

(14) In the side mirror device as set forth above in (12) or (13), the housing may include an internal housing that is disposed in an internal space surrounded by the upper cover, the lower cover, and the center cover, between the internal housing and the center cover, a predetermined gap may be held; and in the gap, a connection member may be disposed that connects between the internal housing and at least one of the upper cover and the lower cover.

(15) In the side mirror device as set forth above in any one of (12) to (14), in an outer circumferential edge portion of at least one of the upper cover and the lower cover, a recess portion may be formed that is engageable with an outer circumferential edge portion of the internal housing and an outer circumferential edge portion of the center cover.

(16) In the side mirror device as set forth above in (15), on a vehicular-width-direction outer end portion of the center cover, a click portion may be formed that engages the internal housing.

(17) In the side mirror device as set forth above in any one of (14) to (16), on a vehicular-width-direction outer end portion of the internal housing, an abutment portion may be provided that abuts the vehicular-width-direction outer end portion of the center cover.

(18) In the side mirror device as set forth above in (17), a vehicular-width-direction inner end portion of the center cover may be engaged with the internal housing via an engaging click.

(19) A side mirror device according to a third aspect of the present invention includes: a mirror, an internal housing that is provided with a mirror holding recess portion for holding the mirror, and a cover that is provided on an outer side of the internal housing, expands between a rear side in a travelling direction on which the mirror is formed and a front side in the travelling direction which is a side away from the mirror, and forms an outer surface of the side mirror device, wherein the cover forms, on a rear side, an opening edge portion that exposes the mirror, wherein the opening edge portion is made of an involuted recess portion, which is a rear-side end portion of the cover being bent inwardly toward the mirror, and wherein with a rear-side end portion of the internal housing being inserted into the involuted recess portion, the rear-side end portion of the cover is engaged with the rear-side end portion of the internal housing.

(20) In the side mirror device as set forth above in (19), an outer surface of the cover may be formed extendingly from the involuted recess portion toward the front side so that an undercut shape is not allowed to be present.

(21) In the side mirror device as set forth above in (19) or (20), a front-side end portion of the cover may constitute a portion that forms a forefront of an outline of the side mirror device.

(22) In the side mirror device as set forth above in any one of (19) to (21), the cover may have an upper cover and a lower cover that are dividable in an up-down direction at a frontmost end of the cover.

(23) In the side mirror device as set forth above in any one of (19) to (22), a side end on a rear side of the cover that constitute the involuted recess portion may be located behind the mirror.

Advantage of the Invention

According to the first aspect of the present invention as set forth above in (1), the bearing mechanism is provided on the upper side of the mirror base, and the inclining mechanism is provided on the lower side of the mirror base. Therefore, with the bearing mechanism and the inclining mechanism being separated with respect to the mirror base in the up-down direction, it is possible to make small the protrusion amount in an upper direction or a lower direction with respect to the mirror base, and hence to make the outline of the housing compact. As a result, the aerodynamic character improves, and it is possible to actualize a side mirror device with a narrow width along the up-down direction and with a sleek design. Furthermore, compared with the structure in which the inclining mechanism is arranged on the inner or outer side of the bearing mechanism, it is also possible to make small the size of the housing along the front-rear direction, to thereby make it possible to actualize a housing with a compact outline. Furthermore, with the inclining mechanism being arrange on the lower side of the mirror base, it is possible to suppress dripping of water onto the inclining mechanism. Therefore, it is possible to effectively prevent the freezing of and the formation of rust on the inclining mechanism.

According to the first aspect of the present invention as set forth above in (2), the bearing mechanism is made of: the inner cylindrical portion that protrudes upwardly from the mirror base; and the outer cylindrical portion that is formed in the housing and covers the inner cylindrical portion. As a result, an abutting distance between the mirror base and the housing in the pivoting direction of the bearing mechanism becomes long. Therefore, it is possible to suppress the shaking when the housing pivots, and to cause the housing to pivot stably and smoothly.

According to the first aspect of the present invention as set forth above in (3), at least a part of the upper surface of the inner cylindrical portion and a part of the inner surface of the outer cylindrical portion are formed so as to overlap each other, to thereby make it possible to prevent water or the like from intruding through the gap between the inner cylindrical portion and the outer cylindrical portion. As a result, it is possible to effectively prevent the freezing of and the formation of rust on the inclining mechanism including metal-made members such as the spring.

According to the first aspect of the present invention as set forth above in (4), the harness for controlling the side mirror device is arranged on the side of the pivot axis line of the bearing mechanism on which the inclining mechanism is formed. Therefore, it is possible to make the outline shape of the housing compact, to thereby actualize a side mirror device excellent in aerodynamic character. Furthermore, it is possible to suppress the interference between the bearing mechanism and the harness that is caused with the pivoting of the housing, to thereby prevent damage to the harness caused by the pivoting of the housing.

According to the first aspect of the present invention as set forth above in (5), with the harness being provided beneath the spring shaft, it is possible to make the outline shape of the housing compact, to thereby actualize a side mirror device excellent in aerodynamic character. Furthermore, it is possible to suppress the interference between the spring and the harness that is caused with the pivoting of the housing, to thereby prevent damage to the harness caused by the pivoting of the housing.

According to the first aspect of the present invention as set forth above in (6), the mirror base is disposed in the vicinity of the center of the housing. As a result, on the upper and lower sides the mirror base, it is possible to secure a large internal space for each of the upper cover and the lower cover. This makes it possible to arrange the bearing mechanism and the inclining mechanism so as to be separated vertically via the mirror base.

According to the first aspect of the present invention as set forth above in (7), the front end wall along the travelling direction of the housing is formed as inclined surfaces that are respectively inclined obliquely upwardly and obliquely downwardly from the front side to the rear side in the travelling direction. With this structure, the inclined surfaces extend respectively upwardly and downwardly from the mirror base that is provided in the vicinity of the center of the housing along the up-down direction. Therefore, when the vehicle is travelling, it is possible to swiftly sever the travel wind, which hits against the side mirror device, in the up-down direction of the housing. Therefore, it is possible to suppress the creation of turbulence, to thereby improve the aerodynamic character.

According to the first aspect of the present invention as set forth above in (8), with the mirror base being formed in a shape of a flat plate that extends in the horizontal direction, it is possible to make narrow the width of the mirror base along the up-down direction. Therefore, it is possible to suppress the collision of the travel wind with the mirror base when the vehicle is travelling, to thereby improve the aerodynamic character.

According to the second aspect of the present invention as set forth above in (9), if the shapes of the outer surface of the upper cover and the outer surface of the lower cover are in a mirror-image symmetry, then the upper cover of the side mirror device on the left side of the vehicle is the same in shape as the lower cover of the side mirror device on the right side of the vehicle. Furthermore, the lower cover of the side mirror device on the left side of the vehicle is the same in shape as the upper cover of the side mirror device on the right side of the vehicle. As a result, with only the upper covers of a single type and the lower covers of a single type, namely, only two types of these upper and lower covers being prepared, it is possible to form the housings of the side mirror device on the left and right sides of the vehicle. Accordingly, the number of types of molds that form the upper cover and the lower cover may be only two as well. Therefore, it is possible to reduce the manufacturing costs of the side mirror device. Furthermore, also at the time of assembly of the side mirror device, it is possible to reduce the number of parts that constitute the housing. Hence, it is possible to simplify the manufacturing steps, to thereby reduce the manufacturing costs.

Furthermore, the shapes of the outer surfaces of the upper cover and the lower cover that constitute the housing are shaped so as to form mirror-symmetrical shapes with respect to each other. Therefore, at the time when the vehicle is travelling, the air flowing along the outer surface of the upper cover and the air flowing along the outer surface of the lower cover are equal in flow speed. Consequently, it is possible to effectively suppress the creation of turbulence behind the housing, to thereby reduce aerodynamic drag. Furthermore, it is also possible to prevent the unpleasant wind noise during travelling that is caused by the turbulence.

According to the second aspect of the present invention as set forth above in (10), the engagement region of the mirror base is disposed between the upper cover and the lower cover, and the engagement region is caused to directly face the upper cover and the lower cover. As a result, while the upper cover and the lower cover is kept in mirror-image symmetry with each other, it is possible to make the upper cover and the lower cover largest in size along the up-down direction. As a result, it is possible to support a large mirror excellent in visibility.

Furthermore, with the engagement region of the mirror base being caused to directly face the upper cover and the lower cover, it is possible to improve a sense of integratedness between the mirror and the housing, to thereby actualize a side mirror device excellent in design.

According to the second aspect of the present invention as set forth above in (11), the travel wind that hits the side mirror device when the vehicle is travelling is branched at the mirror base into the upper and lower flows, which flow rearwardly at substantially equal speeds.

As a result, it is possible to more securely prevent a difference in flow speed from being produced between the upper side and lower side of the housing. Therefore, it is possible to suppress the creation of turbulence in the rear portion of the housing, to thereby reduce aerodynamic drag and unpleasant wind noise during travelling.

According to the second aspect of the present invention as set forth above in (12), between the upper cover and the lower cover, there is formed a center cover that continuously extends outwardly from the engagement region of the mirror base along the vehicular width direction, and the center cover disposed so as to be sandwiched between the upper cover and the lower cover. Therefore, on the front side of the housing, it is possible to visually recognize the surface from the outer surface of the upper cover via the surface of the center cover to the outer surface of the lower cover as a stretch of continuous surface with little unevenness. As a result, it is possible to improve a sense of integratedness in the appearance of the housing, to thereby actualize a side mirror device excellent in design.

According to the second aspect of the present invention as set forth above in (13), with the engagement region of the mirror base and the center cover being formed so as to have substantially the same width, at least in their mutual connection portion, along the up-down direction of the vehicle, it is possible to form the lower end of the upper cover and the upper end of the lower cover in a linear shape. As a result, it is possible to prevent interference between the mirror base and the center cover that is caused by a positional displacement between the upper cover and the lower cover in the horizontal direction. Furthermore, it is possible to improve a sense of integratedness between the mirror base and the center cover, to thereby actualize a side mirror device excellent in design.

According to the second aspect of the present invention as set forth above in (14), there are provided: an upper cover, a lower cover; and an internal housing that is disposed in the internal space surrounded by the center cover, wherein a predetermined gap is kept between the internal housing and the center cover, and wherein in the gap, a connection member is provided that connects between the internal housing and at least one of the upper cover and the lower cover. This results in a structure in which at least one of the upper cover and the lower cover is engaged with the internal housing not on the inner side of the upper cover and the lower cover but on the inner side of the center cover. Therefore, it is possible to arrange the outer surfaces of the upper cover and the lower cover closer to the internal housing. As a result, it is possible to make the inclination angle on the front side, at which the outer surfaces of the upper cover and the lower cover are in contact with the center cover, acuter (sharper angle). Therefore, it is possible to make the outline of the housing compact, to thereby actualize a side mirror device that is small and excellent in design.

According to the second aspect of the present invention as set forth above in (15), a recess portion is formed in the end portion of the upper cover and in the end portion of the lower cover. With the recess portions, the outer circumferential edge portion of the internal housing and the outer circumferential edge portion of the center cover are engaged. Therefore, it is possible to use the recess portions, which are used for engaging the upper cover and the lower cover with the internal housing, also for engagement with the center cover. Therefore, it is possible to simplify the attachment structure, to thereby reduce the manufacturing costs of the side mirror device.

According to the second aspect of the present invention as set forth above in (16), the click portion that engages the internal housing is formed on a vehicular-width-direction outer side end portion of the center cover. Therefore, even if in the assembly of the side mirror device, the outer circumferential edge portion of the center cover is in a state of not being inserted into the recess portions of the upper cover and the lower cover, it is possible to prevent the shakiness of the center cover, to thereby enhance the rigidity of the whole.

According to the second aspect of the present invention as set forth above in (17), with the vehicular-width-direction outer side end portion of the center cover being brought into abutment with the abutment portion of the internal housing, it is possible to prevent the displacement of the center cover along the vehicular width direction, to thereby improve the attachment workability of the upper cover and the lower cover.

According to the second aspect of the present invention as set forth above in (18), a vehicular-width-direction inner end portion of the center cover is engaged with the internal housing via the engaging click. Therefore, even if in the assembly of the side mirror device, the outer circumferential edge portion of the center cover is in a state of not being inserted into the recess portions of the upper cover and the lower cover, it is possible to prevent the shakiness of the center cover, to thereby enhance the rigidity of the whole. Furthermore, if a click portion that engages the internal housing is formed on a vehicular-width-direction outer side end portion of the center cover, then the center cover is supported on both of the vehicular-width-direction outer side end portion and the inner side end portion in the vehicular width direction. Therefore, it is possible to further improve the supporting rigidity for the center cover.

According to the third aspect of the present invention as set forth above in (19), into these involuted recess portions, the rear-side end portion of the internal housing is inserted to engage the rear-side end portions of the cover with the rear-side end portion of the internal housing. As a result, to the outer surface of the external mirror device, a parting line, step, groove, or the like that is produced at the butting between the members will not be exposed.

Namely, an engagement portion between the rear-side end portions of the cover and the rear-side end portion of the internal housing is formed by the involuted recess portions on the inner side of the cover that is unlikely to be visually recognized from outside. Furthermore, this engagement portion is also hidden by the mirror whose circumferential edge is surrounded by the involuted recess portions. This prevent a parting line, step, groove, or the like of the engagement portion from being visually recognized from outside. This makes it possible to actualize a side mirror device that is excellent in a sense of integratedness when seen from outside and that secures a sleek and excellent design.

Furthermore, because the engagement portion between the rear-side end portions of the cover and the rear-side end portion of the internal housing is not exposed to the outside surface side of the cover, the flow of air that is flowing along the outside surface side of the cover at the time of travelling of the vehicle will not be obstructed. This does not allow the side mirror device to create turbulence. Therefore, it is made possible to effectively suppress the creation of unpleasant wind noise.

Furthermore, the folded-back rear-side end portions of the cover and the rear-side end portion of the internal housing overlap each other in the involuted recess portions. Accordingly, even if the rear-side end portions of the cover and the rear-side end portion of the internal housing are each reduced in thickness, required strength is ensured. Therefore, thinning of the thickness makes it possible to improve the molding characteristic.

According to the third aspect of the present invention as set forth above in (20), it is possible to simplify the mold that is used when the cover is molded. Namely, with slide cores being only provided on the location corresponding to the involuted recess portion, it is possible to perform the demolding of the upper cover with ease. This makes it possible to reduce the manufacturing costs of the cover.

According to the third aspect of the present invention as set forth above in (21), the front-side end portions of the cover form the forefront of the contour of the side mirror device. As a result, it is possible to actualize an outer surface with a shape that allows no undercut shape to be present from the involuted recess portions formed on the rear side of the cover toward the front side of the cover. Then, it is possible to arrange the front-side end portions of the cover in line with the contour (ridge line) of the outline shape of the side mirror device, and hence, to ensure an excellent design.

According to the third aspect of the present invention as set forth above in (22), it may suffice that both of the mold for molding the upper cover and the mold for molding the lower cover be provided with a simple slide core. Therefore, it is possible to reduce the manufacturing costs of the mold.

According to the third aspect of the present invention as set forth above in (23), the side mirror device is formed so that the side ends on the rear side of the cover constituting the involuted recess portions are located behind the reflecting surface of the mirror in the travelling direction. As a result, in attaching the upper cover and the lower cover in the assembly steps of the side mirror device, it is possible to suppress the interference with the mirror, and to further improve the assembly workability.

BRIEF DESCRIPTION OF THE DRAWINGS

FIG. 3 is an external perspective view of a side mirror device when seen from ahead.

FIG. 15 is a schematic diagram showing how a cover is formed by use of a mold.

DESCRIPTION OF THE EMBODIMENTS

Figure 1:
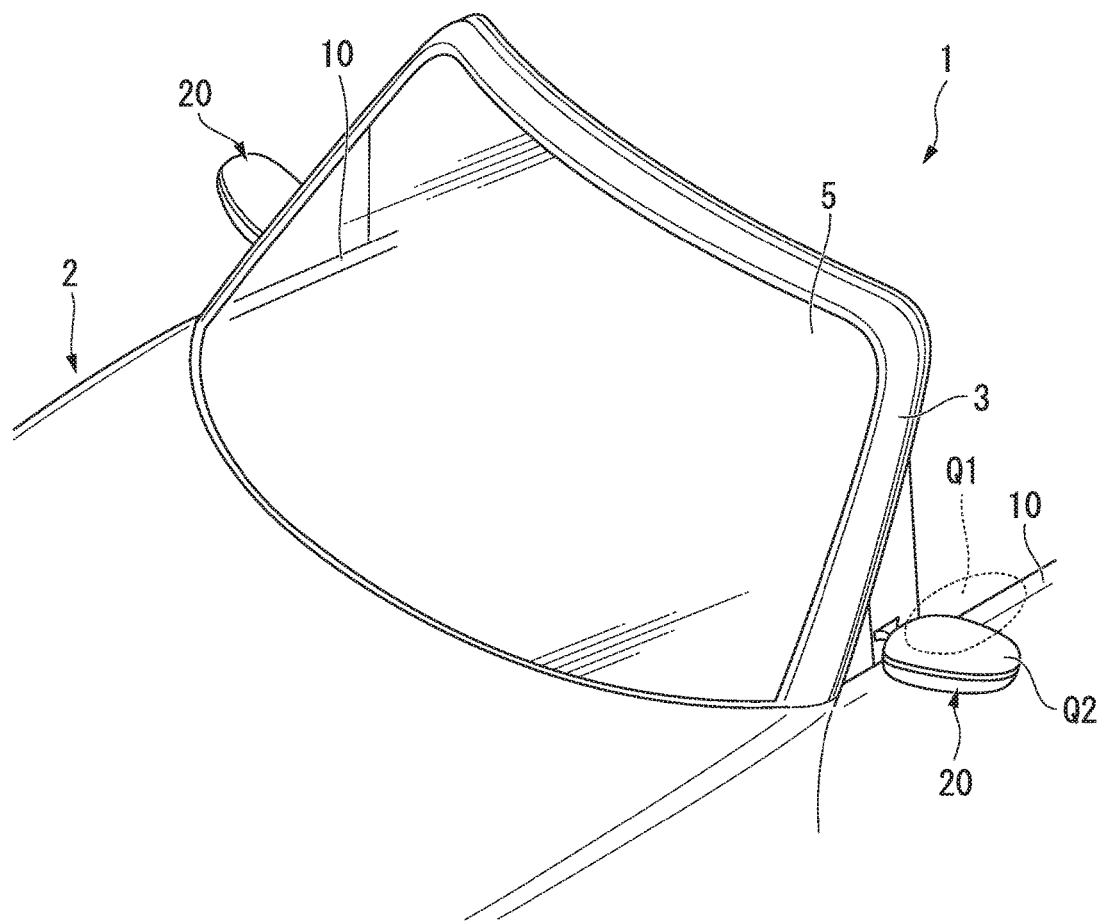
FIG. 1 is a perspective view showing a vicinity of a front portion of a vehicle when the vehicle is seen from obliquely ahead.

Hereunder is a description of a side mirror device of the present invention with reference to the drawings. Note that the embodiments shown below are specifically described for better understanding of the spirit of the present invention, and hence, do not limit the present invention unless otherwise specified. Furthermore, in the drawings used in the following description, there are cases where, for convenience' sake, main portion(s) are shown in an enlarged manner for easier understanding of the features of the present invention. Therefore, the ratio among dimensions of each constituent element is not necessarily the same as that of the actual one.

In the following description, a front side in a travelling direction (front-rear direction) of a vehicle is referred to simply as front side while a rear side in the travelling direction is referred to simply as rear direction; a direction along the front side and the rear side is referred to as travelling direction; an upper side in an up-down direction (direction of gravity) is referred to simply as upper side while a lower side in the up-down direction is referred to simply as lower side; a direction along the upper side and the lower side is referred to as up-down direction; and a width direction of the vehicle that is rectangular to the travelling direction and to the up-down direction is referred to simply as vehicular width direction. Furthermore, in each of the drawings that are referred to, the travelling direction is denoted with an L, the up-down direction with an H, and the vehicular width direction with a W, each by means of an arrow.

Figure 2:
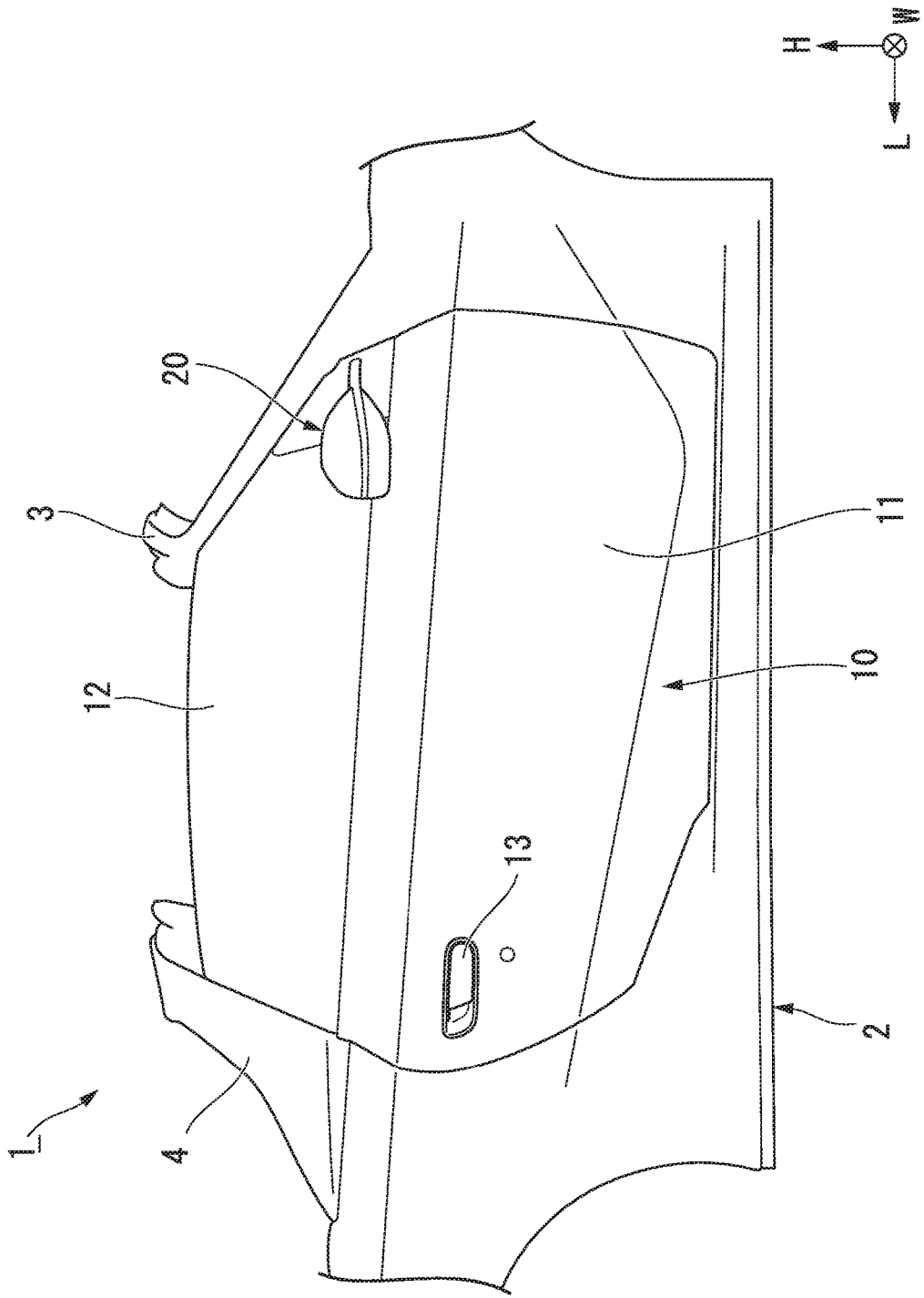
FIG. 2 is a plan view showing a vicinity of a door of the vehicle.

FIG. 1 is a perspective view showing a vicinity of a front portion of a vehicle when the vehicle is seen from obliquely front. Furthermore, FIG. 2 is a plan view showing a vicinity of a door of the vehicle.

A vehicle 1 provided with a side mirror structure according to the present embodiment is, for example, a two-door car with an open roof in which a roof portion between front a pillar 3 and a rear pillar 4 that are used for a body 2 is openable (convertible, cabriolet). To both side surfaces of the body 2 along a travelling direction L, there are respectively attached doors 10, 10 in an openable manner. Furthermore, to the front pillar 3, there is attached a front windshield 5.

The door 10 includes: a door main body 11; a door glass 12 that is attached to the door main body 11 so as to be vertically movable; and an outer handle 13. Furthermore, on a connection portion on a front side of the door main body 11 to the front pillar 3, there is formed a side mirror device 20.

Note that the side mirror devices 20 provided on the side surfaces of the vehicle 1 are formed respectively on the door 10 on the right side and the door 10 on the left side when seen from the front side of the vehicle 1. In the following description, attention is focused on the side mirror device 20 on the left side that is formed on the door 10 on the left side when seen from the front side of the vehicle 1. Accordingly, the side mirror device 20 on the right side that is formed on the door 10 on the right side has a similar structure to the side mirror device 20 on the left side.

Figure 4:
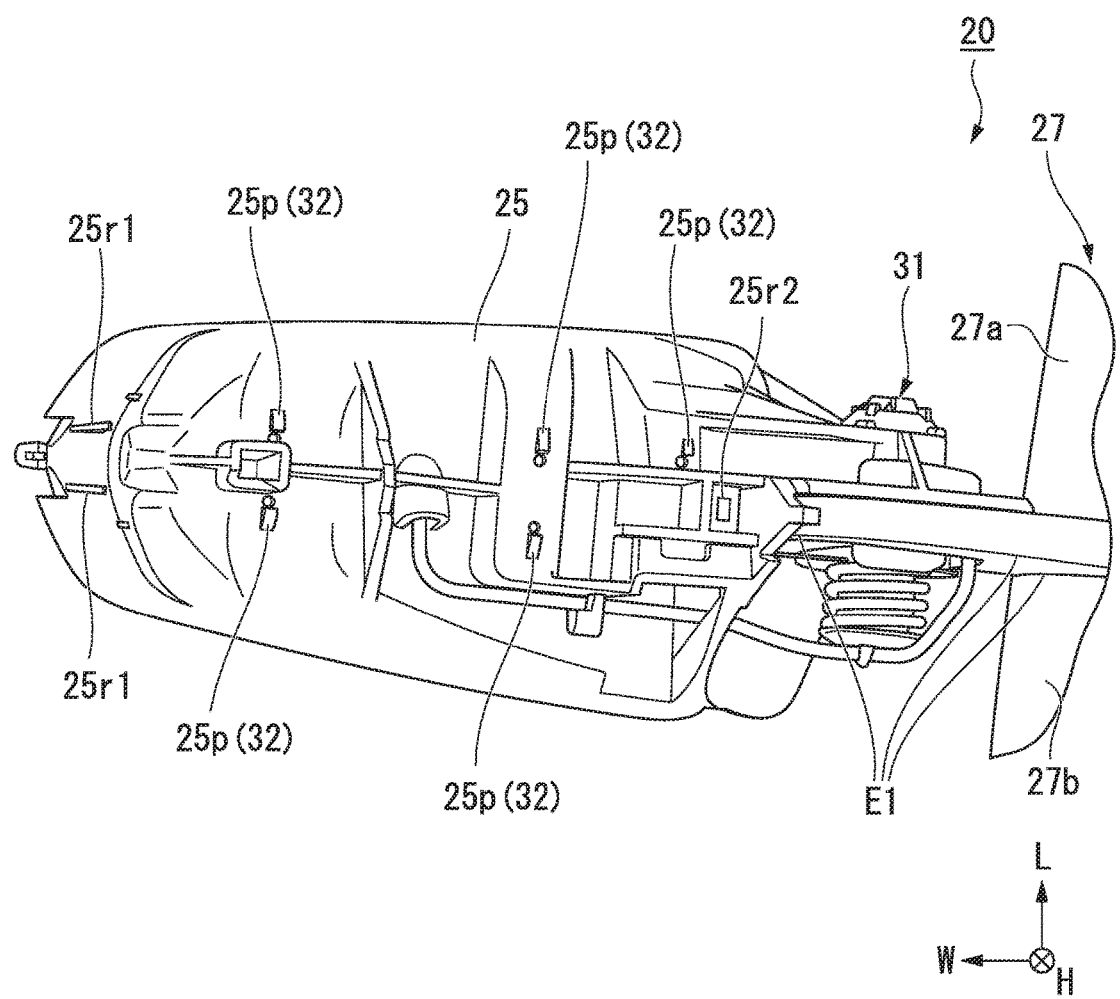
FIG. 4 is an external perspective view of the side mirror device in a state with a housing being removed.
Figure 5:
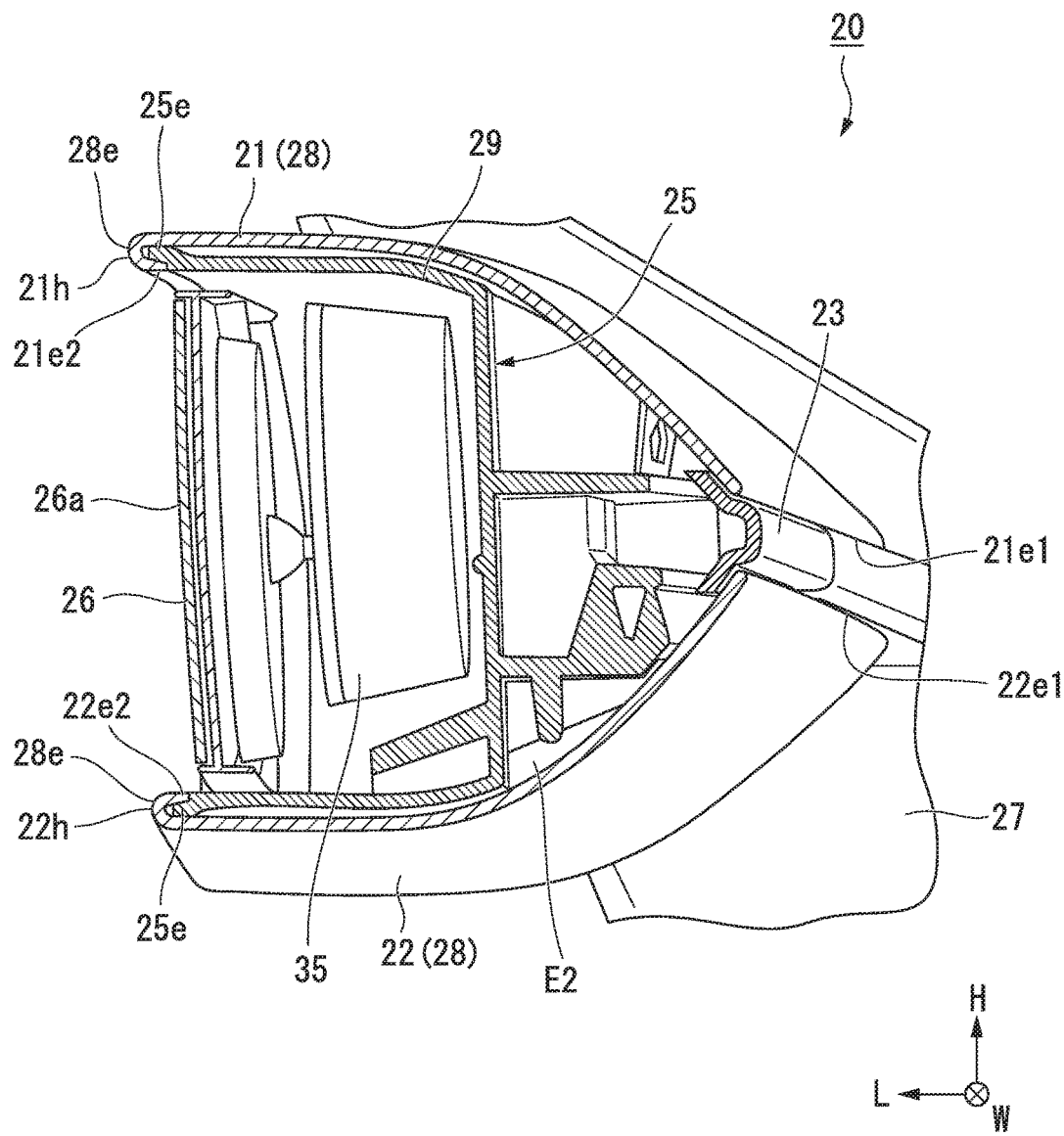
FIG. 5 is a cross-sectional view showing a cross-section of the side mirror device taken along the A-A line of FIG. 3.
Figure 6:
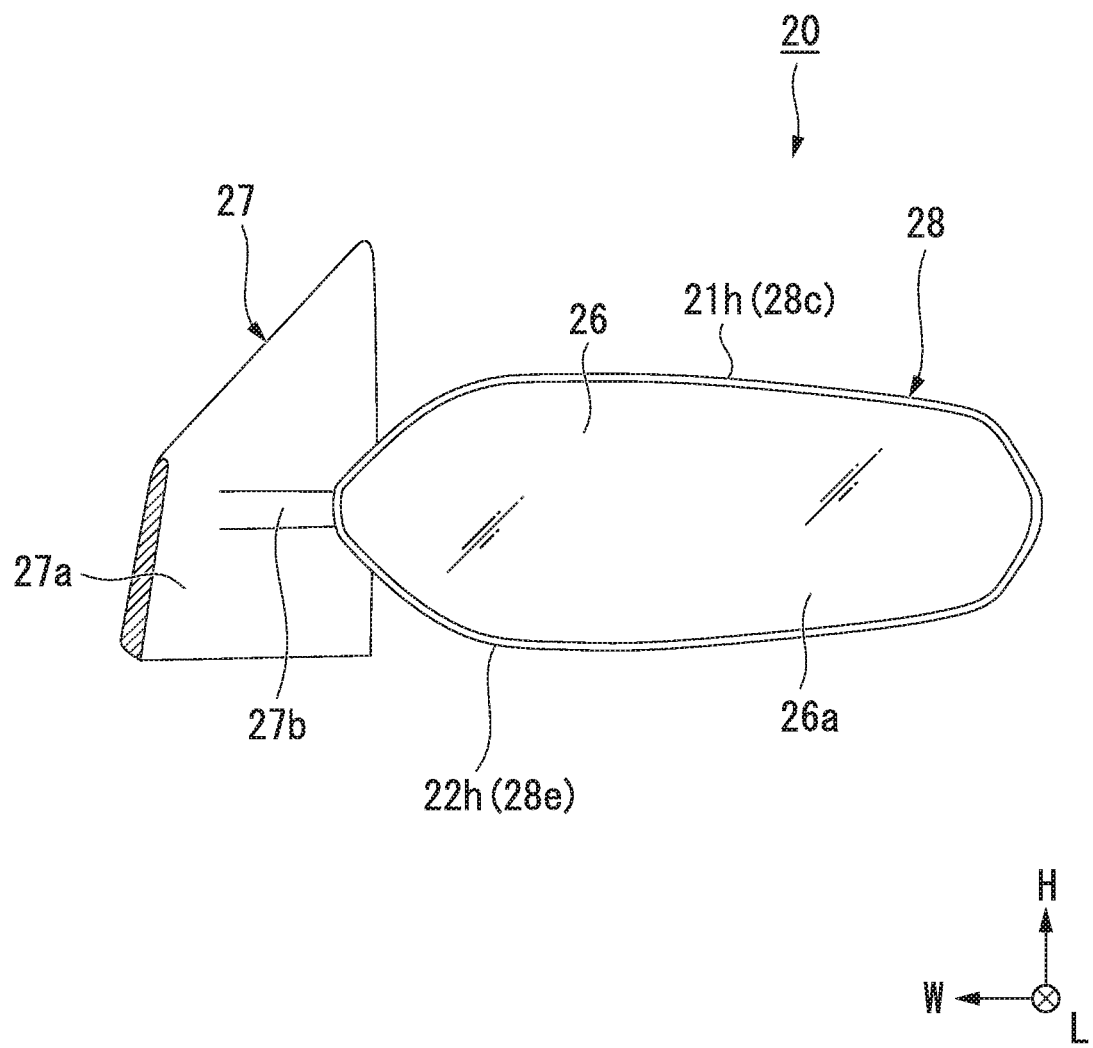
FIG. 6 is an external perspective view of the side mirror device when seen from rear.

FIG. 3 is an external perspective view of the side mirror device when seen from front. FIG. 4 is an external perspective view showing the side mirror device in a state with a housing being removed. FIG. 5 is a cross-sectional view showing a cross-section of the side mirror device taken along the A-A line of FIG. 3. FIG. 6 is an external perspective view of the side mirror device when seen from behind in the travelling direction.

The side mirror device 20 of the present embodiment has: a housing 24 including an upper cover (upper-portion cover) 21, a lower cover (lower-portion cover) 22, and a center cover 23; an internal housing 25 and a mirror 26 that are arranged in an interior of the housing 24; and a mirror base 27 that pivotably supports the housing 24 via the internal housing 25. The internal housing 25 includes a mirror holding recess portion 29 that holds the mirror 26. The housing 24 includes a cover 28 that covers the internal housing 25.

The internal housing 25 is a member that forms a skeletal outline of the housing 24. On the rear side of the internal housing 25 along the travelling direction L of the vehicle 1, the mirror holding recess portion 29 that holds the mirror 26 is formed. The mirrors 26 that are attached to the outer surfaces of the vehicle 1 along the vehicular width direction are contained in the mirror holding recess portions 29, and reflecting surfaces (mirror surfaces) 26a are exposed so as to face to the rear side.

The mirror 26 is attached so that the reflecting surface 26a is adjustable to an optional orientation (angle) by a mirror moving mechanism 35 formed in the internal housing 25.

In a part of the internal housing 25 close to the body 2, there is formed a pivoting device (bearing mechanism) 31. The internal housing 25 is attached via the pivoting device 31 so as to be pivotable with respect to the mirror base 27. The pivoting device 31 pivots the housing 24 between a retraction position, in which the reflecting surface 26a of the mirror 26 faces the side surface of the body 2, and a use position, in which the reflecting surface of the mirror 26 faces in the rear direction of the body 2, for example, through an operation on a mirror open/close switch (not shown in the figures).

Note that description of the directions of the side mirror device 20 of the present embodiment is determined with reference to those in this use position.

The mirror base 27 is formed integrally of: a plate-like vertical portion 27a the lower end of which is fixed to the door main body 11 and which expands along the up-down direction; and a plate-like horizontal portion 27b that protrudes in a substantially horizontal direction from the vicinity of the center of the vertical portion along the vehicular width direction W. This horizontal portion 27b of the mirror base 27 is axially attached to the pivoting device 31 of the internal housing 25 so as to be pivotable.

The cover 28 forms an outer surface that shapes a contour (external shape) of the side mirror device 20, and expands between the rear side on which the mirror 26 is formed and the front side that is away from the mirror 26. This cover 28 is provided so as to cover the outer side of the internal housing 25. In an interior of the cover 28, there is formed a space that contains the internal housing 25.

The cover 28 is made of: an upper cover (upper-portion cover) 21; a lower cover (lower-portion cover) 22; and a center cover 23. The upper cover 21 is formed so as to cover a region upper than the center along the up-down direction H of the side mirror device 10. Furthermore, the lower cover 22 is formed so as to cover a region lower than the center along the up-down direction H of the side mirror device 10. In addition, the center cover 23 is formed in a central portion of the side mirror device 10 along the up-down direction H so as to close a gap between the upper cover 21 and the lower cover 22.

The cover 28 with this structure is formed so as to have an outer surface with a shape that does not allow an undercut shape to be present from the involuted recess portions 21h, 22h, which are formed on the rear side of the cover 28, toward the front side of the cover 28. Namely, the cover 28 is formed so as to have an outer surface that does not include an element in the direction from the front side of the cover 28 toward the involuted recess portions 21h, 22h, which is a direction opposite to the direction from the involuted recess portions 21h, 22h toward the front side of the cover 28.

Figure 7:
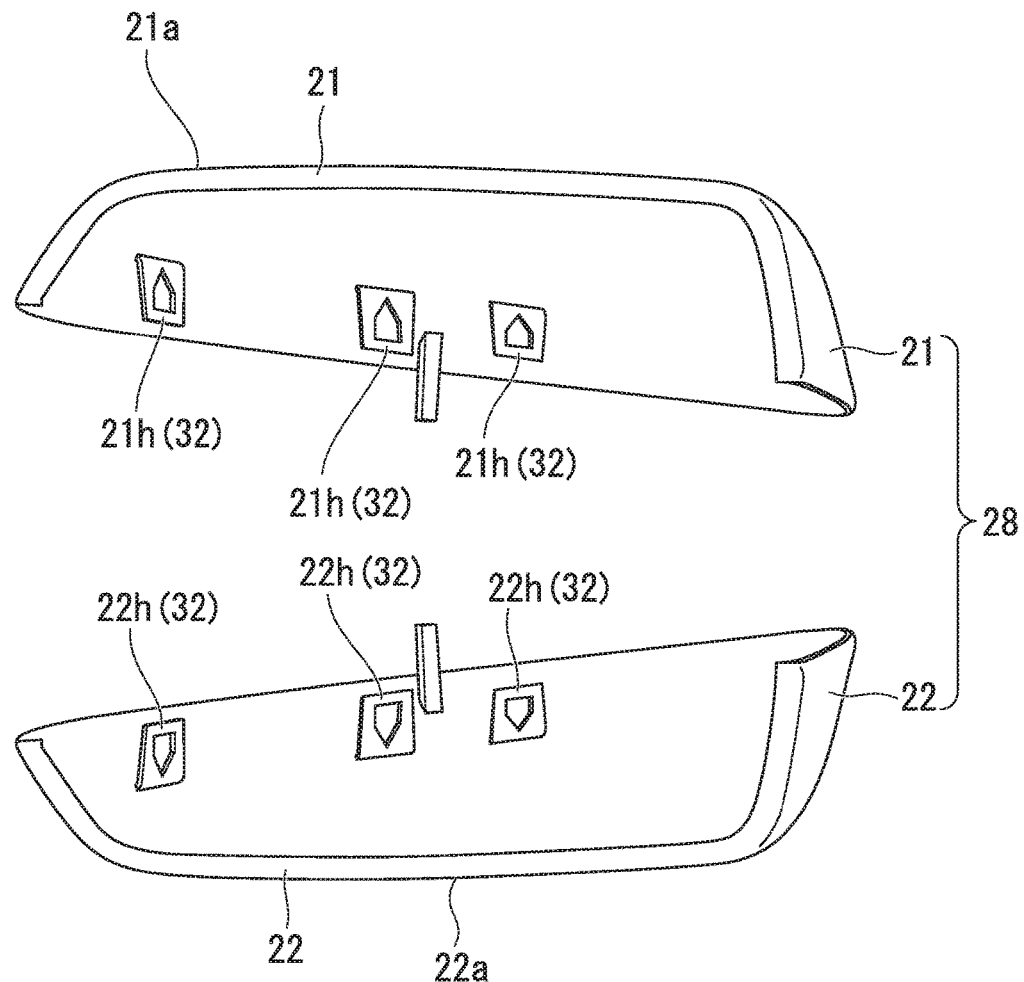
FIG. 7 is a perspective view showing an upper cover and a lower cover of the housing.

The upper cover 21 and the lower cover 22 are arranged in a manner opposed to each other via the center cover 23, and are formed, as a whole, by, for example, molding with a resin material. An outer surface 21a of the upper cover 21 and an outer surface 22a of the lower cover 22 are formed so as to have shapes that are mirror-image symmetrical to each other with respect to their mutual facing surface (see FIG. 7).

Thus, because the shape of the outer surface 21a of the upper cover 21 and the shape of the outer surface 22a of the lower cover 22 are mirror-image symmetrical to each other, the upper cover 21 that is used for the housing 24 of the side mirror device 20 on the left side of the vehicle 1 and the lower cover 22 that is used for the housing 24 of the side mirror device 20 on the right side of the vehicle 1 have the same shape and are made of the same member.

Furthermore, the lower cover 22 that is used for the housing 24 of the side mirror device 20 on the left side of the vehicle 1 and the upper cover 21 that is used for the housing 24 of the side mirror device 20 on the right side of the vehicle 1 have the same shape and are made of the same member.

The outer surface 21a of the upper cover 21 and the outer surface 22a of the lower cover 22 are formed in shapes that are further inclined toward the rear of the vehicle 1 as the outer surfaces 21a, 22a of the upper cover 21a and the lower cover 22a, respectively, are farther away from the mirror base 27 along the up-down direction H of the vehicle 1.

Furthermore, the outer surface 21a of the upper cover 21 and the outer surface 22a of the lower cover 22 are formed in shapes in which the inclinations of their respective outer surfaces 21a, 22a come closer to the horizontal direction as the outer surface 21a and the outer surface 22a are rearwardly farther away from the mirror base 27 along the travelling direction L of the vehicle 1.

To be more specific, as shown in FIG. 5, the outer surface 21a of the upper cover 21 and the outer surface 22a of the lower cover 22 that constitute the cover 28 are in contact with the center cover 23 on the front side of the vehicle 1 in the travelling direction L, and from the portion in contact with the center cover 23, they extend toward the rear side at approximately 45° respectively in an obliquely upper direction and in an obliquely lower direction. Furthermore, the outer surface 21a of the upper cover 21 and the outer surface 22a of the lower cover 22 are shaped so that their inclinations are less steep so as to gradually closer to the horizontal direction as they extend further to the rear side and so that they are substantially horizontal in the vicinity of the rear end portions where the mirror 26 is formed (ahead of the involuted recess portions 21h, 22h).

A front end wall that forms a front end of the housing 24 along the travelling direction L is shaped in inclined surfaces that are inclined obliquely upwardly and obliquely downwardly, respectively, from the front side toward the rear side in the travelling direction L of the vehicle 1. To be more specific, the outer surface 21a of the upper cover 21 forms an inclined surface that is inclined obliquely upwardly from the front end toward the rear side while the outer surface 22a of the lower cover 22 forms an inclined surface that is inclined obliquely downwardly from the front end toward the rear side. Thus, the front end of the housing 24 along the travelling direction L is made of the front ends of these inclined surfaces of the upper cover 21 and the lower cover 22.

Furthermore, an end portion of the cover 28 on the front side is a forefront of the outer surface that constitutes the contour (external shape) of the side mirror device 20. To be more specific, as shown in FIG. 5, of a front-side end portion 21e1 of the upper cover 21 along the travelling direction L, of a front-side end portion 22e1 of the lower cover 22 along the travelling direction L, and of the center cover 23 that is arranged between the front-side end portion 21e1 and the front-side end portion 22e1, the forefront of the contour (external shape) of the side mirror device 20 is made.

In an end portion of the cover 28 on the rear side in the travelling direction L, there is formed an opening edge portion 28e that allows the reflecting surface 26a of the mirror 26 to be exposed toward the rear side. The opening edge portion 28e is made of the involuted recess portions 21h, 22h, which are formed respectively from a vicinity of a rear-side end portion 21e2 of the upper cover 21 that constitutes the cover 28 being bent approximately 180° (folded back) toward the mirror 26 and from a vicinity of a rear-side end portion 22e2 of the lower cover 22 being bent approximately 180° (folded back) toward the mirror 26. In these involuted recess portions 21h, 22h, there is formed a gap in the folded-back portions (recess-like portions) of the end portions 21e2, 22e2, the gap having approximately a thickness of the rear-side end portion (abutment portion) 25e of the internal housing 25.

In these involuted recess portion 21h and the involuted recess portion 22h, their end portions are in contact with each other without a gap. When seen from the rear side in the travelling direction L, the involuted recess portion 21h and the involuted recess portion 22h form the opening edge portion 28e with a substantially ellipsoidal shape that surrounds the circumference of the mirror 26.

Into the involuted recess portions 21h, 22h, the rear-side end portion (abutment portion) 25e of the internal housing 25 is inserted. The rear-side end portion (abutment portion) 25e of the internal housing 25 may be, for example, a rear-side end portion of the circumferential wall of the mirror holding recess portion 29.

In a state of being inserted into the involuted recess portions 21h, 22h, the rear-side end portion (abutment portion) 25e of the internal housing 25 is caulked (crimped) and fixed. With this structure, the rear sides of the upper cover 21 and the lower cover 22 are engaged with the rear side of the internal housing 25.

The rear-side end portion 21e2 of the upper cover 21 and the rear-side end portion 22e2 of the lower cover 22 that are directed to the mirror 26 side by the involuted recess portions 21h, 22h are positioned on the further rear side than the reflecting surface 26a of the mirror 26 in the travelling direction L.

The mirror base 27 that extends outwardly from the side surface of the vehicle 1 is formed integrally of: the plate-like vertical portion 27a the lower end of which is fixed to the door main body 11 and which expands along the up-down direction; and the plate-like horizontal portion 27b that expands substantially horizontally from the vicinity of the center of the vertical portion along the vehicular width direction W. The horizontal portion 27b of the mirror base 27 is arranged in the vicinity of the center of the housing 24 along the up-down direction H. In the horizontal portion 27b of this mirror base 27, an end portion in the protrusion direction is an engagement region E1. In this engagement region E1, the internal housing 25 is axially attached in a pivotable manner.

On the front side in the travelling direction L, the mirror base 27 directly faces the upper cover 21 on the upper side of the engagement region E1, and directly faces the lower cover 22 on the lower side of the engagement region E1. Namely, in this engagement region E1, the mirror base 27 is arranged between the front end of the upper cover 21 and the front end of the lower cover 22 without interpolation of another member, for example, the center cover 23 or the like.

Figure 8:
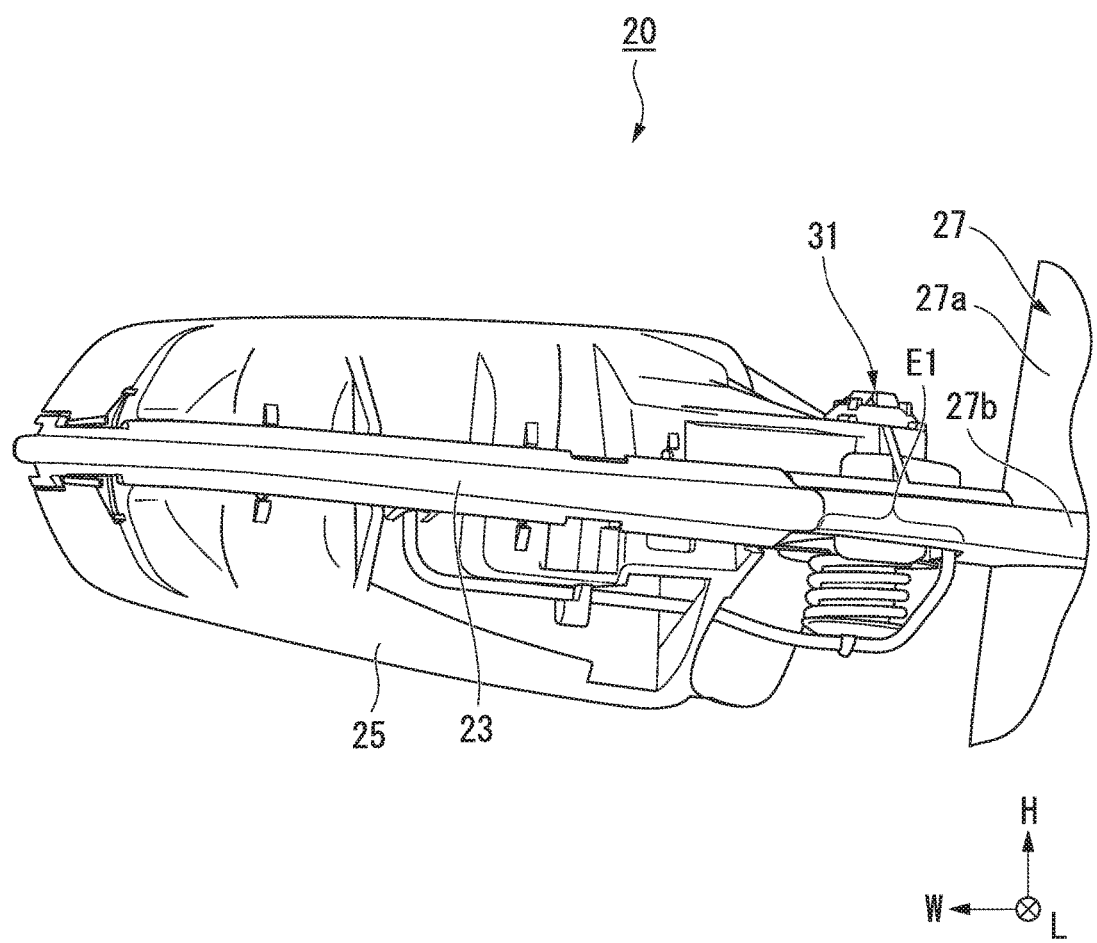
FIG. 8 is a perspective view showing a state in which a center cover is engaged with an internal housing.

The center cover 23 that constitutes the housing 24 has a shape that is continuous to an end portion of the horizontal portion 27b of the mirror base 27, and that continuously extends outwardly from the engagement region E1 of the mirror base 27 along the vehicular width direction W (see FIG. 8).

To be more specific, on the front side in the travelling direction L, the center cover 23 is formed so that a width (thickness), along the up-down direction H, of the connection portion to the engagement region E1 of the mirror base 27 is substantially the same as a width (thickness), along the up-down direction H, of the horizontal portion 27b of the mirror base 27.

Furthermore, on the front side in the travelling direction L, the center cover 23 has a shape that closes a gap between the front end of the upper cover 21 and the front end of the lower cover 22 and that is sandwiched between the upper cover 21 and the lower cover 22.

The internal housing 25 is provided in an internal space E2 that is surrounded by the upper cover 21, the lower cover 22, and the center cover 23. Via the pivoting device (bearing mechanism) 31 that is formed close to the body 2, the internal housing 25 is pivotably attached to the engagement region E1 of the horizontal portion 27b of the mirror base 27. For example, through the operation on a mirror open/close switch (not shown in the figures), the pivoting device 31 causes the housing 24 to pivot between a retraction position Q1 (see FIG. 1), in which the reflecting surface of the mirror 26 faces the side surface of the body 2, and a use position Q2 (see FIG. 1), in which the reflecting surface of the mirror 26 faces in the rear direction of the body 2.

Note that description of the directions of the side mirror device 20 in the present embodiment is determined with reference to those in this use position Q2.

Furthermore, on the rear side in the travelling direction L, the internal housing 25 pivotably supports the mirror 26. The mirror 26 is attached by the mirror moving mechanism 35 (see FIG. 5) so as to be adjustable to an optional orientation.

Next is a description of an engagement structure among the members that constitute the housing 24.

Figure 9:
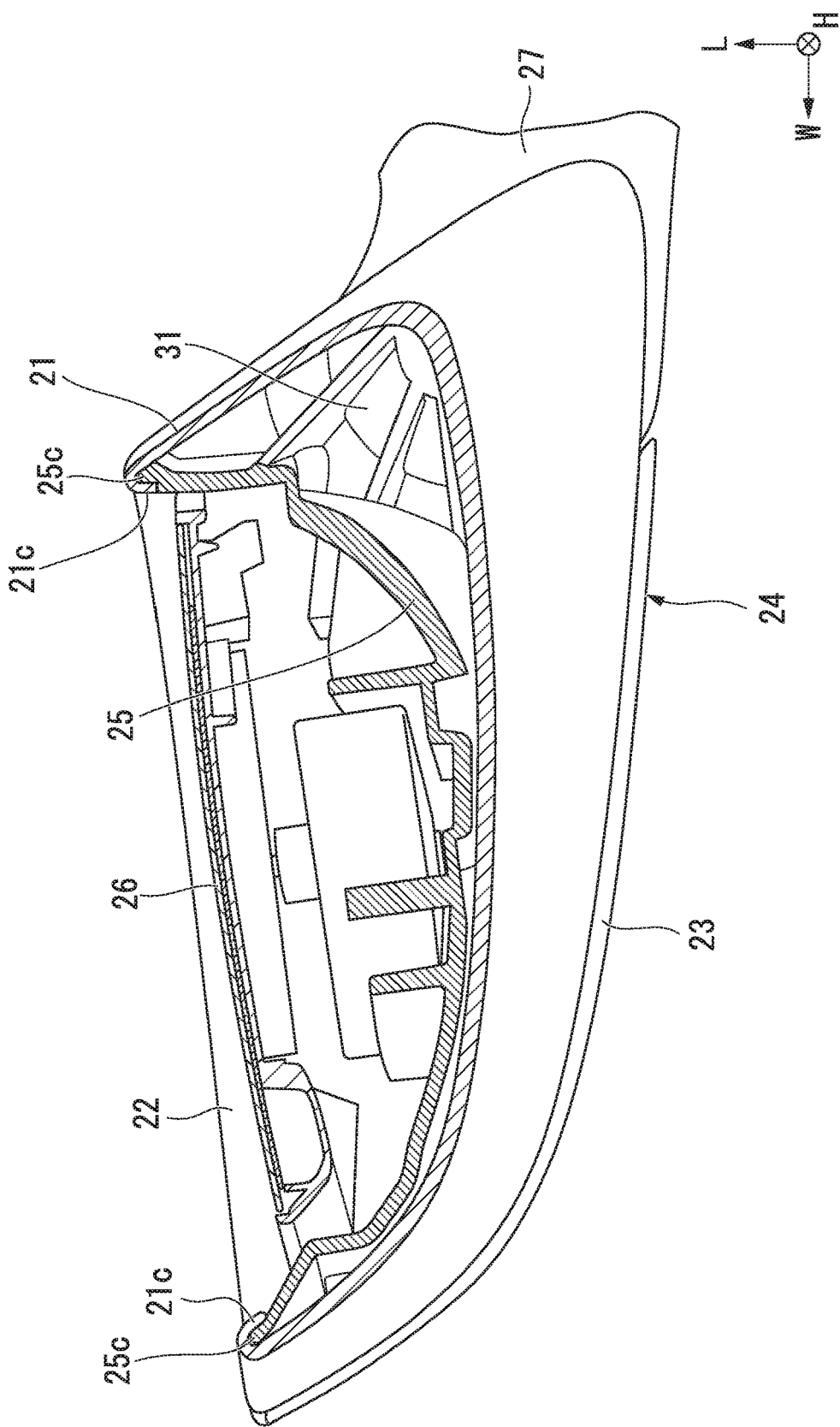
FIG. 9 is a cross-sectional view of an upper cover portion of the side mirror device taken along a vehicular width direction.
Figure 10:
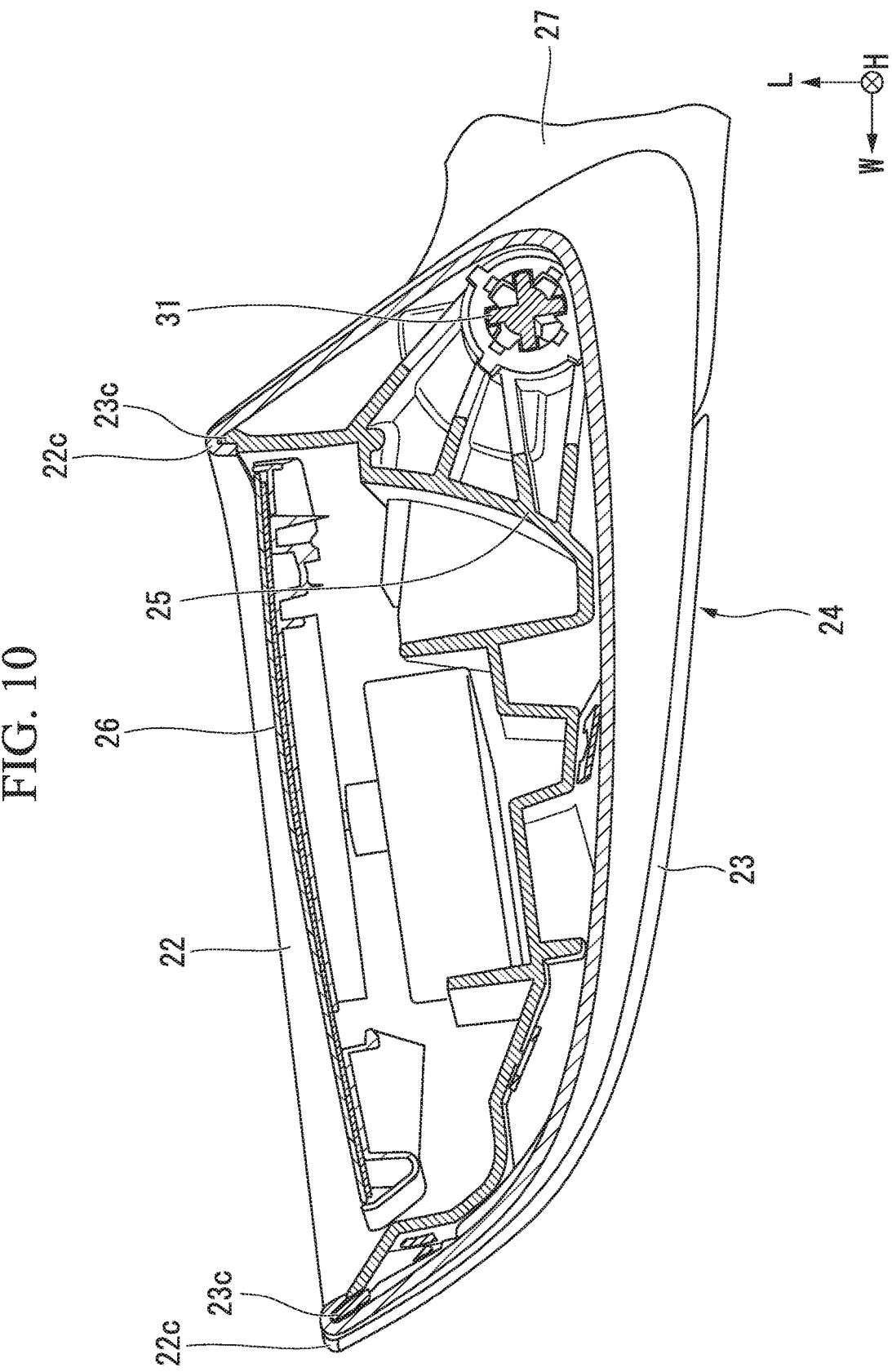
FIG. 10 is a cross-sectional view of a center cover portion of the side mirror device taken along the vehicular width direction.

FIG. 9 is a cross-sectional view of an upper cover portion of the side mirror device taken along the vehicular width direction. Furthermore, FIG. 10 is a cross-sectional view of a center cover portion of the side mirror device taken along the vehicular width direction.

In the outer circumferential edge portions of the upper cover 21 and the lower cover 22, there are formed: an outer circumferential edge portion 25C of the internal housing 25 on the rear side in the travelling direction L; and recess portions 21C, 22C, respectively, that are engageable with an outer circumferential edge portion 23C of the center cover 23.

Namely, the recess portions 21C, 22C are respectively formed by inwardly folding back the outer circumferential edge portions of the upper cover 21 and the lower cover 22 on the rear side in the travelling direction L. Into these recess portions 21C, 22C, which are fold-back portions (rim portions), the outer circumferential edge portion 25C of the internal housing 25 and the outer circumferential edge portion 23C of the center cover 23 are inserted. As a result, on the rear side of the housing 24, the upper cover 21 and the lower cover 22 are engaged with the internal housing 25 and the center cover 23.

Here, conventionally, it is a general practice to form a rim portion of the housing by outwardly folding back the outer circumferential edge portion of the internal housing 25. The reason is this. Because, in the conventional cover, the cover that covers the internal housing is formed in an integral manner or so as to be vertically asymmetrical, the outer circumferential edge portion of the cover is not always the most protruded portion of the whole of the cover. Therefore, if the cover is provided with the rim portion, it is not possible for the mold to be demolded due to the structure of the mold. However, in the present embodiment, the upper cover 21 and the lower cover 22 are vertically symmetrical, and the outer circumferential edge portions of the covers 21, 22 are the most protruded portion of the whole of the cover. Therefore, even if each of the covers 21, 22 is provided with a rim portion, it is possible for the mold to be demolded.

Figure 11:
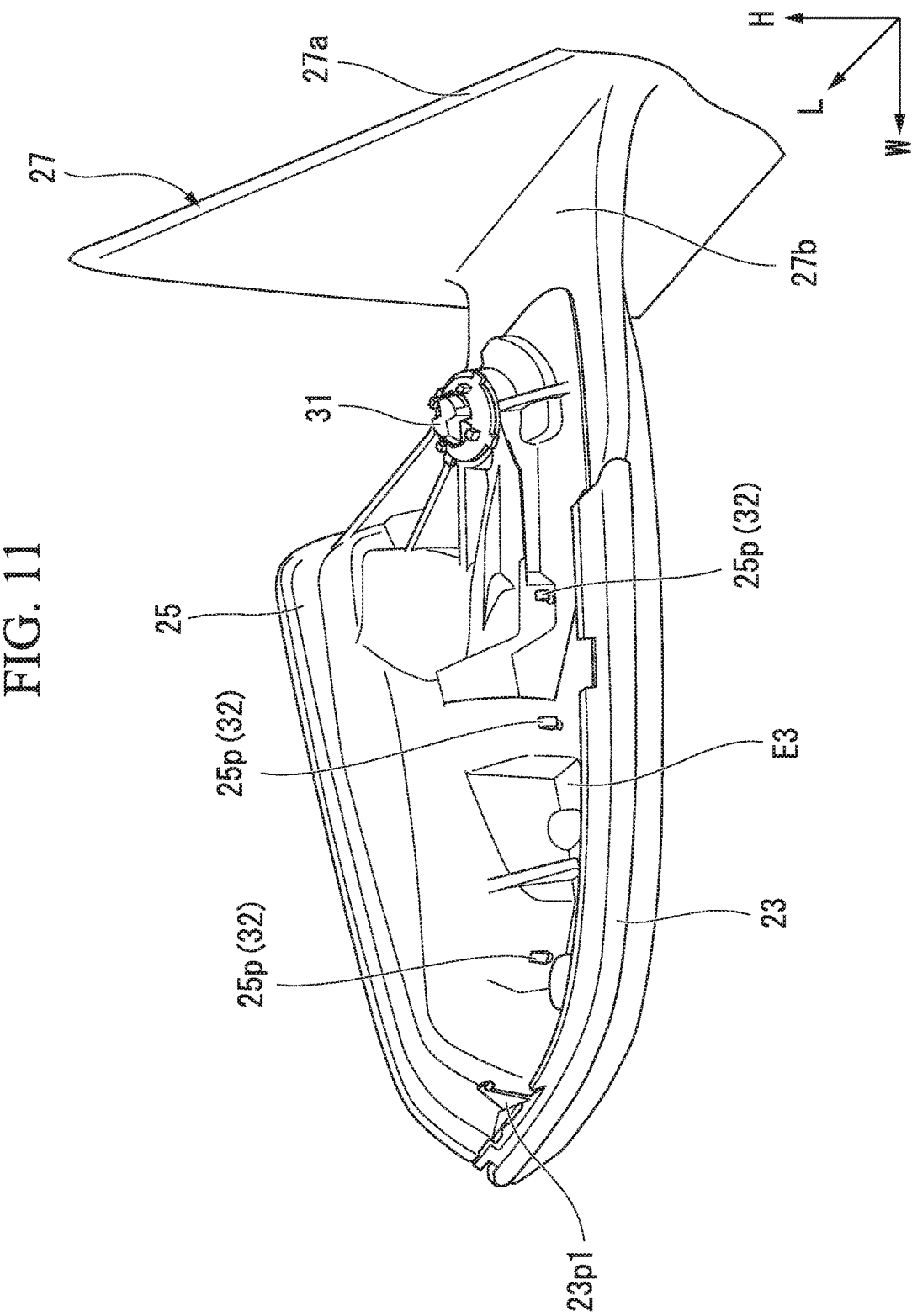
FIG. 11 is a perspective view of the side mirror device when seen from obliquely above, in a state with the upper cover and the lower cover being removed.

FIG. 11 is a perspective view of the side mirror device when seen from obliquely above, in a state with the upper cover and the lower cover being removed.

Between the internal housing 25 and the center cover 23, there is formed a predetermined gap E3. In this gap, there are formed connection members 32 that connect between the upper cover 21 as well as the lower cover 22 and the internal housing 25. The connection member 32 is made of: engaging holes 21h, 22h (see FIG. 7) that are formed respectively in inner surface sides of the upper cover 21 and the lower cover 22; and engaging protrusions 25p (see FIG. 4) that are formed respectively on the upper and lower sides of the internal housing 25.

With this structure, the engaging protrusions 25p formed respectively on the upper and lower sides of the internal housing 25 are locked respectively in the engaging holes 21h of the upper cover 21 and in the engaging holes 22h of the lower cover 22. As a result, on the front side of the housing 24, the upper cover 21 and the lower cover 22 are engaged with the internal housing 25.

Figure 12:
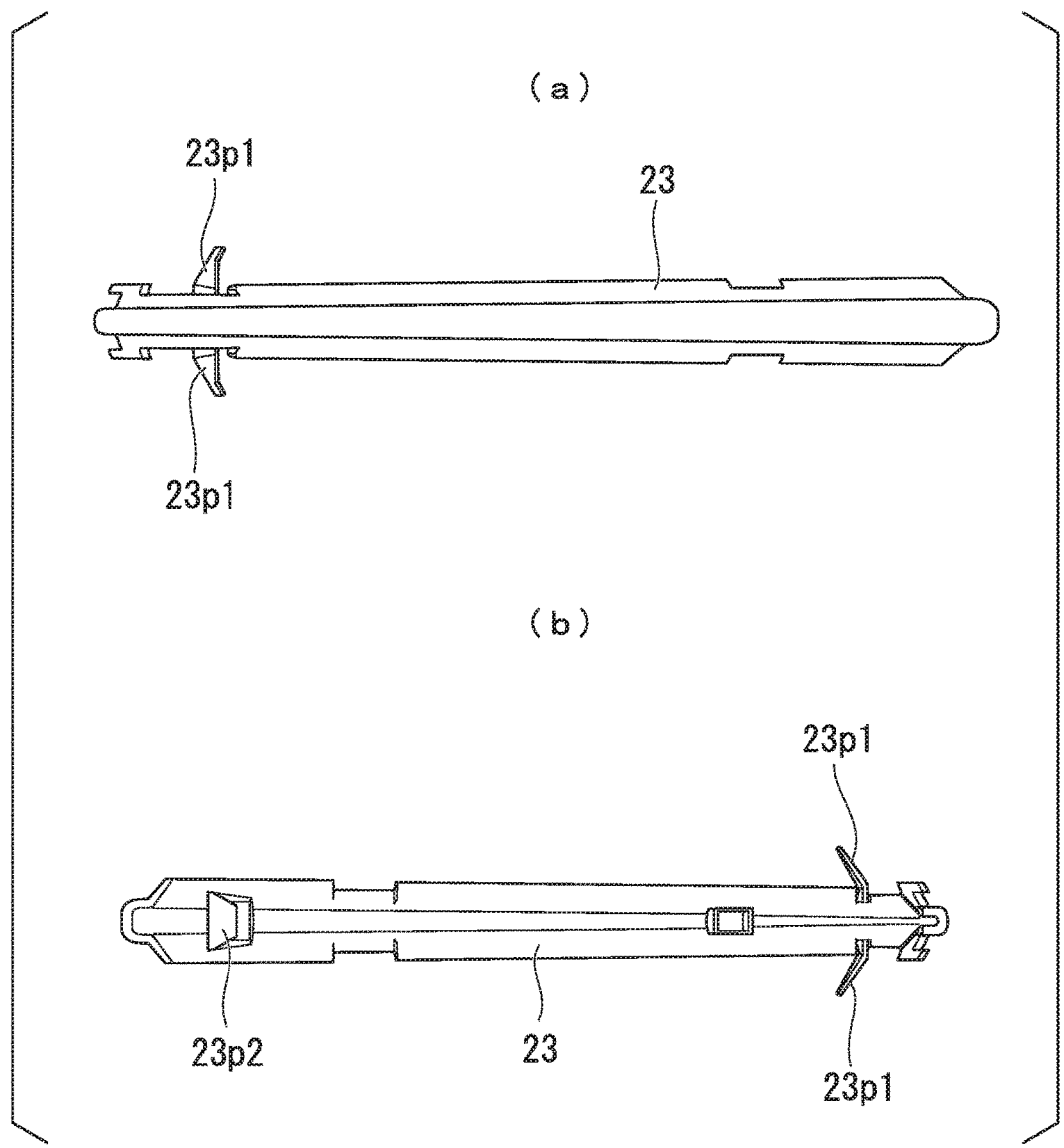
FIG. 12(a) is a plan view showing an outer surface side of the center cover. Furthermore.
FIG. 12(b) is a plan view showing an inner surface side of the center cover.

FIG. 12(a) is a plan view showing an outer surface side of the center cover. Furthermore, FIG. 12(b) is a plan view showing an inner surface side of the center cover.

On an outer-side edge portion of the center cover 23 along the vehicular width direction W, there are formed click portions 23p1 that are to be engaged with the internal housing 25. Furthermore, on an inner edge portion of the center cover 23 along the vehicular width direction W, there is formed an engaging click 23p2 that is to be engaged with the internal housing 25.

The click portions 23p1 engage click engaging portions 25r1 that are formed on the internal housing 25. On the other hand, the engaging click 23p2 engages a click engaging hole 25r2 that is formed in the internal housing 25.

By the click portions 23p1 and the engaging click 23p2, the center cover 23 is engaged with the internal housing 25 in the outer-side edge portion and the inner-side edge portion along the vehicular width direction W.

Figure 13:
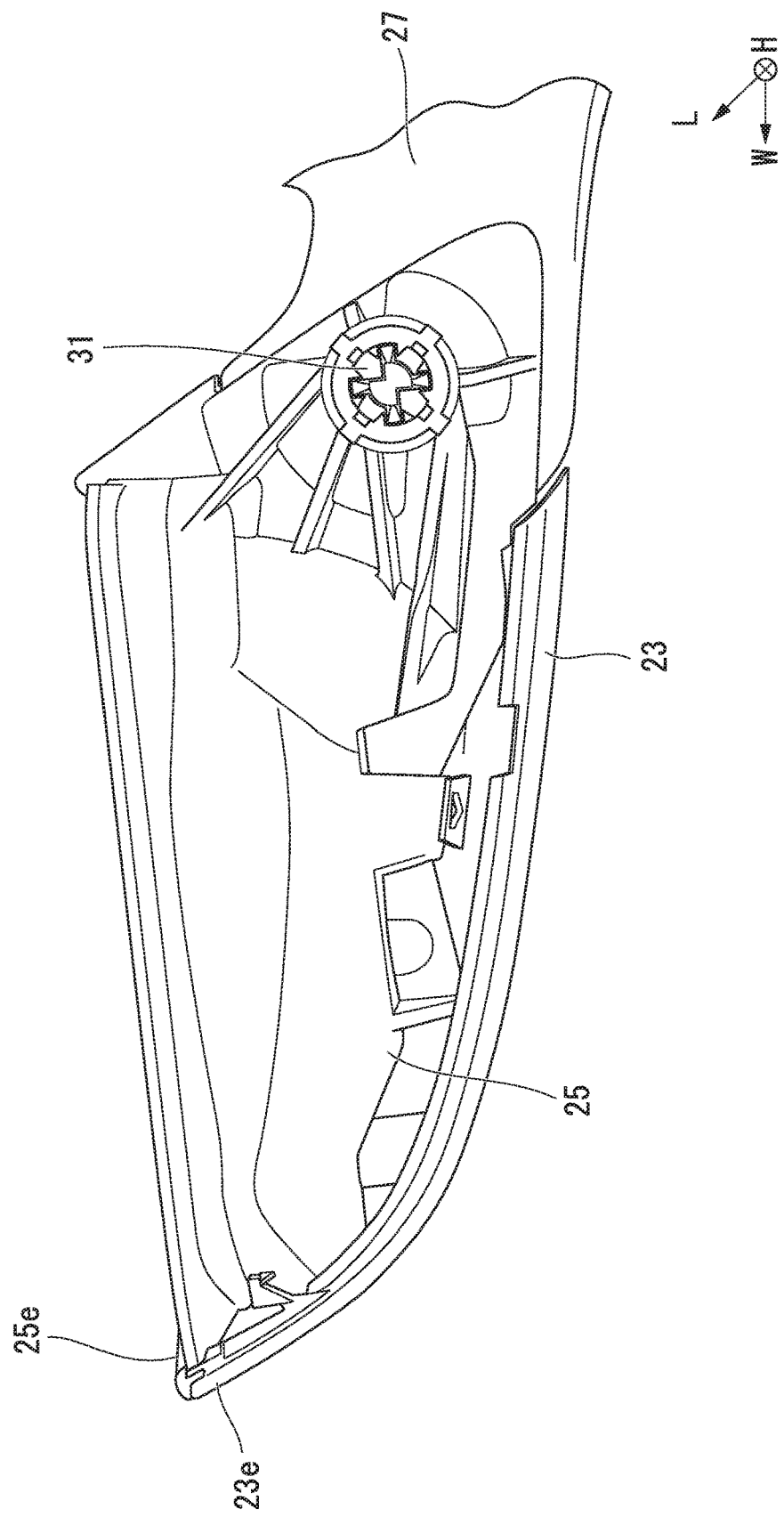
FIG. 13 is a perspective view showing how the internal housing and center cover are engaged.

As shown in FIG. 13, in an outer-side edge portion 23e along the vehicular width direction W, the center cover 23 is in abutment with an abutment portion 25e of the internal housing 25. To be more specific, as for the center cover 23, the outer-side edge portion 23e along the vehicular width direction W is in contact with the abutment portion 25e, which is an outer-side edge portion of the internal housing 25 along the vehicular width direction W.

Figure 14:
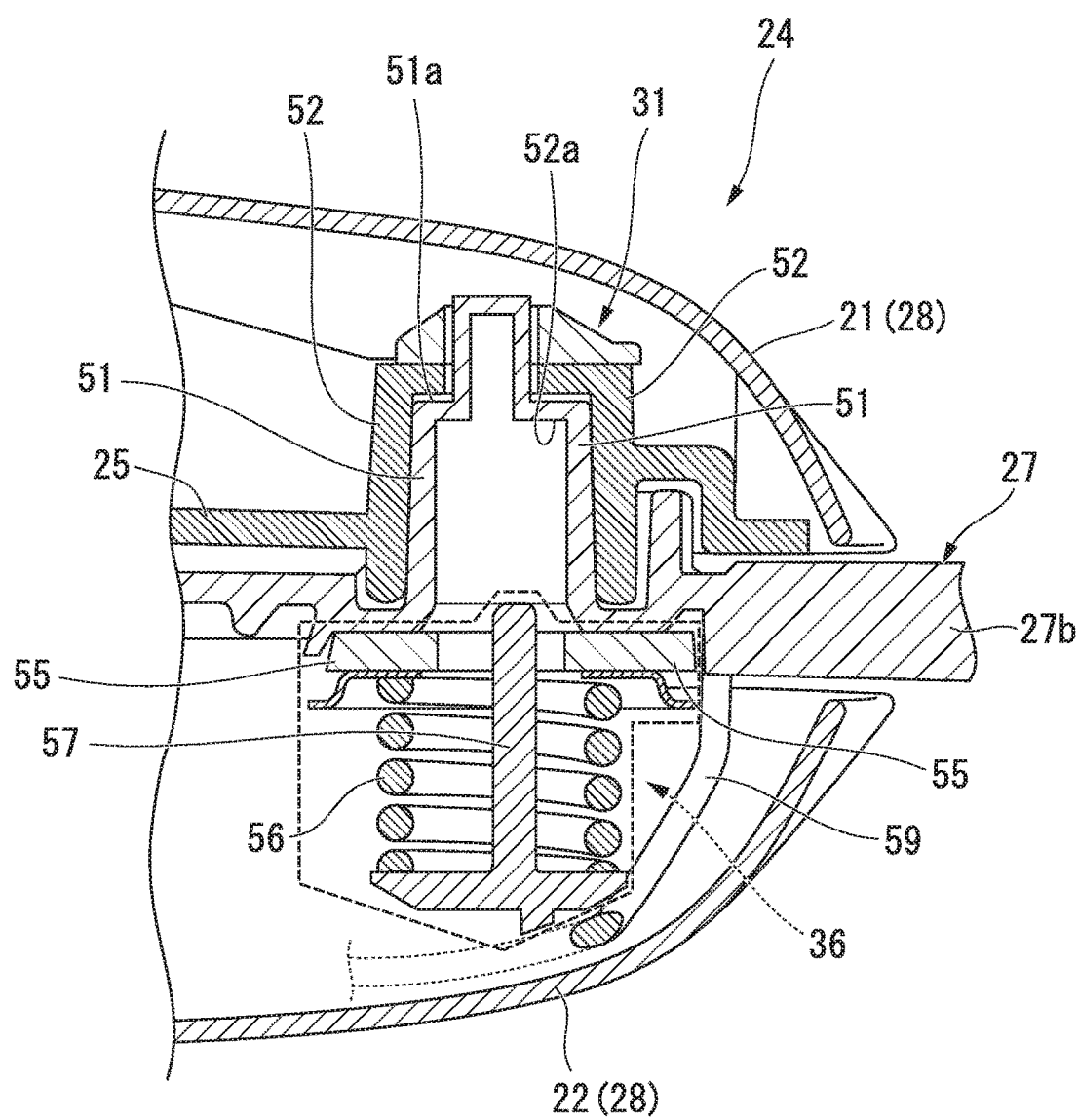
FIG. 14 is an enlarged cross-sectional view of a main part of an engagement portion between a mirror base and the housing.

FIG. 14 is an enlarged cross-sectional view of a main part showing an engagement portion between the mirror base and the housing.

In the engagement portion between the mirror base 27 and the housing 24, the pivoting device (bearing mechanism) 31 and an inclining mechanism 36 are formed in the interior of the housing 24. When, in the use position Q2, a stress beyond a preset value is applied to the housing 24 toward the rear side in the travelling direction L, the inclining mechanism 36 causes the housing 24 to pivot toward the retraction position Q1. As a result, damage to the side mirror device 20 is prevented.

The pivoting device (bearing mechanism) 31 and the inclining mechanism 36 are formed so as to face each other across the mirror base 27 along a pivot axis line of the pivoting device 31. To be more specific, the pivoting device (bearing mechanism) 31 is formed on an upper side of the horizontal portion 27b of the plate-shaped mirror base 27, and is covered with the upper cover 21. Furthermore, the inclining mechanism 36 is formed on a lower side of the horizontal portion 27b of the plate-shaped mirror base 27, and is covered with the lower cover 22.

The pivoting device (bearing mechanism) 31 includes: an inner cylindrical portion 51 that protrudes upwardly from the horizontal portion 27b of the mirror base 27 along the axis line of the pivoting device (bearing mechanism) 31; and an outer cylindrical portion 52 that is formed in the internal housing 25 constituting the housing 24 and covers the inner cylindrical portion 51. With the outer cylindrical portion 52, which is fixed to the internal housing 25, pivoting around the inner cylindrical portion 51, which is fixed to the body 2 via the mirror base 27, the housing 24 is allowed to pivot between the retraction position Q1 and the use position Q2.

At least a part of an upper surface 51a of the inner cylindrical portion 51 that constitutes the pivoting device (bearing mechanism) 31 and a part of an inner surface 52a of the outer cylindrical portion 52 are formed so as to overlap each other. To be more specific, in the present embodiment, the upper surface 51a of the inner cylindrical portion 51 that is on an inner side of the outer cylindrical portion 52 and the inner surface 52a of the outer cylindrical portion 52 that faces the upper surface 51a are in slidable contact with each other.

The inclining mechanism 36 is a member in a region surrounded by a broken line in FIG. 14, and includes: an engagement member 55 that engages the lower surface of the horizontal portion 27b of the mirror base 27; a spring 56 that biases the engagement member 55 toward the mirror base 27; and a spring shaft 57 that extends along a pivot axis line of the pivoting device (bearing mechanism) 31 and is inserted into the spring 56. The whole of the inclining mechanism 36 is located lower than the lower surface of the horizontal portion 27b of the mirror base 27.

In the inclining mechanism 36, when an excessive stress is applied from the front side to the rear side of the housing 24, the engagement member 55 that is pressed against the horizontal portion 27b of the mirror base 27 by the spring 56 pivots with respect to the mirror base 27 while resisting a biasing force of the spring 56. As a result, the housing 24 is caused to pivot toward the retraction position Q1.

On the lower side of the inclining mechanism 36, there is arranged a harness 59. The harness 59 is a control wire for controlling the mirror moving mechanism 35 (see FIG. 5), which adjusts the orientation of the mirror 26, from the vehicle 1, and is led from the vehicle 1 into the housing 24 via the mirror base 27.

In the present embodiment, this harness 59 extends downwardly from the horizontal portion 27b of the mirror base 27, and passes beneath the spring shaft 57 to extend to the mirror moving mechanism 35.

Operations of the side mirror device of the present embodiment with the structure as described above will be described. In the side mirror device 20 of the present embodiment, the pivoting device (bearing mechanism) 31 is provided on the upper side of the horizontal portion 27b of the mirror base 27, and furthermore, the inclining mechanism 36 is provided on the lower side of the horizontal portion 27b of the mirror base 27. Thus, with the pivoting device (bearing mechanism) 31 and the inclining mechanism 36 being divided with respect to the mirror base 27 in the up-down direction H, it is possible to make small a protrusion amount in the upward or downward direction with respect to the mirror base 27.

Namely, in the case where the pivoting device (bearing mechanism) 31 and the inclining mechanism 36 are arranged in an overlapping manner on the upper or lower side of the mirror base 27, the protrusion amount in the upper or lower direction becomes large. Especially in the structure where the horizontal portion 27b of the mirror base 27 is present at the center of the housing 24 as is the case with the present embodiment, if the pivoting device (bearing mechanism) 31 and the inclining mechanism 36 are provided on either the upper or lower side, then the protrusion amount in the up or down direction becomes extremely large, leading to a decrease in aerodynamic character.

However, with the pivoting device (bearing mechanism) 31 and the inclining mechanism 36 being separated with respect to the mirror base 27 in the up-down direction H as is the case with the present embodiment, it is possible to make the outline of the housing 24 compact. As a result, the aerodynamic character improves, and it is possible to actualize a side mirror device 20 with a narrow width along the up-down direction and with a sleek design. Furthermore, compared with the structure in which the inclining mechanism 36 is arranged on the inner or outer side of the pivoting device (bearing mechanism) 31, it is also possible to make small the size of the housing 24 along the front-rear direction L, to thereby make it possible to actualize a housing 24 with a compact outline.

Furthermore, with the inclining mechanism 36 being arranged on the lower side of the mirror base 27, it is possible to suppress dripping of water onto the inclining mechanism 36 including metal-made members such as the spring 56. Therefore, it is possible to effectively prevent the freezing of and the formation of rust on the inclining mechanism 36.

Furthermore, in the side mirror device 20 of the present embodiment, the pivoting device (bearing mechanism) 31 is made of: the inner cylindrical portion 51 that protrudes upwardly from the mirror base 27; and the outer cylindrical portion 52 that is formed in the housing 24 and covers the inner cylindrical portion 51. As a result, an abutting distance between the mirror base 27 and the housing 24 in the pivoting direction of the pivoting device (bearing mechanism) 31 becomes long. Therefore, it is possible to suppress the shaking when the housing 24 pivots, and to cause the housing 24 to pivot stably and smoothly.

Furthermore, in the side mirror device 20 of the present embodiment, at least a part of the upper surface 51a of the inner cylindrical portion 51 and a part of the inner surface 52a of the outer cylindrical portion 52 are formed so as to overlap each other, to thereby make it possible to prevent water or the like from intruding through the gap between the inner cylindrical portion 51 and the outer cylindrical portion 52. As a result, it is possible to effectively prevent the freezing of and the formation of rust on the inclining mechanism 36 including meta-made members such as the spring 56.

Furthermore, in the side mirror device 20 of the present embodiment, the harness 59 for controlling the side mirror device 20 is arranged on the side of the pivot axis line of the pivoting device (bearing mechanism) 31 on which the inclining mechanism 36 is formed. In general, the pivoting device (bearing mechanism) 31 has a size larger than that of the inclining mechanism 36. Therefore, with the harness 59 being disposed on the inclining mechanism 36 side of the lower cover 22 that has more space than the pivoting device 31 side, it is possible to make the outline shape of the housing 24 compact, to thereby actualize a side mirror device 20 excellent in aerodynamic character. Furthermore, it is possible to suppress the interference between the pivoting device (bearing mechanism) 31 and the harness 59 that results from the pivoting of the housing 24, to thereby prevent damage to the harness caused by the pivoting of the housing 24.

Furthermore, in the side mirror device 20 of the present embodiment, the inclining mechanism 36 includes: an engagement member 55 that engages the mirror base 27; a spring 56 that biases the engagement member 55 toward the mirror base 27; and a spring shaft 57 that is inserted into the spring 56, wherein the harness is provided beneath the spring shaft 57. With this structure, it is possible to make the outline shape of the housing 24 compact, to thereby actualize a side mirror device 20 excellent in aerodynamic character. Furthermore, it is possible to suppress the interference between the spring 56 and the harness 59 that results from the pivoting of the housing 24, to thereby prevent damage to the harness caused by the pivoting of the housing 24.

Furthermore, in the side mirror device 20 of the present embodiment, the horizontal portion 27b of the mirror base 27 is disposed in the vicinity of the center of the housing 24 along the up-down direction H. With this structure, on the upper and lower sides of the horizontal portion 27b of the mirror base 27, it is possible to secure a large internal space for each of the upper cover 21 and the lower cover 22. This makes it possible to arranged the pivoting device (bearing mechanism) 31 and the inclining mechanism 36 so as to be separated vertically via the horizontal portion 27b of the mirror base 27.

Furthermore, in the side mirror device 20 of the present embodiment, the front end wall along the travelling direction L of the housing 24 is formed as inclined surfaces that are respectively inclined obliquely upwardly and obliquely downwardly from the front side to the rear side in the travelling direction. With this structure, the inclined surfaces extend respectively upwardly and downwardly from the mirror base 27 that is provided in the vicinity of the center of the housing 24 along the up-down direction H. Therefore, it is possible to swiftly cut the travel wind, which hits against the side mirror device 20, in the up-down direction of the housing 24. Therefore, it is possible to suppress the creation of turbulence, to thereby improve the aerodynamic character.

Furthermore, in the side mirror device 20 of the present embodiment, with the horizontal portion 27b of the mirror base 27 being formed in a shape of a flat plate that extends in the horizontal direction, it is possible to make narrow the width of the mirror base 27 along the up-down direction H. Therefore, it is possible to suppress the collision of the travel wind with the mirror base 27, to thereby improve the aerodynamic character.

Furthermore, in the side mirror device 20 of the present embodiment, with the shapes of the outer surfaces 21a, 22a of the upper cover 21 and the lower cover 22, respectively, that constitute the housing 24 being formed so as to be in a mirror-image symmetry with each other. Therefore, it is possible to simplify the assembly steps, to thereby reduce the manufacturing costs.

Namely, if the shapes of the outer surface 21a of the upper cover 21 and the outer surface 22a of the lower cover 22 are in a mirror-image symmetry, then the upper cover 21 of the side mirror device 20 on the left side of the vehicle 1 is the same in shape as the lower cover 22 of the side mirror device 20 on the right side of the vehicle 1. Furthermore, the lower cover 22 of the side mirror device 20 on the left side of the vehicle 1 is the same in shape as the upper cover 21 of the side mirror device 20 on the right side of the vehicle 1.

As a result, with only the upper covers 21 of a single type and the lower covers 22 of a single type, namely, only two types of these upper and lower covers being prepared, it is possible to form the housings 24 of the side mirror device 20 on the left and right sides of the vehicle 1. Accordingly, the number of types of molds that form the upper cover 21 and the lower cover 22 may be only two as well. Therefore, it is possible to reduce the manufacturing costs of the side mirror device 20. Furthermore, also at the time of assembly of the side mirror device 20, it is possible to reduce the number of parts that constitute the housing 24. Hence, it is possible to simplify the manufacturing steps, to thereby reduce the manufacturing costs.

Furthermore, in the side mirror device 20 of the present embodiment, the shapes of the outer surfaces 21a, 22a of the upper cover 21 and the lower cover 22, respectively, that constitute the housing 24 are formed so as to be in a mirror-image symmetry with each other. Therefore, it is possible to prevent the turbulence from being created behind the housing.

Namely, the shape of the outer surface 21a of the upper cover 21 and the shape of the outer surface 22a of the lower cover 22 are mirror-symmetrical shapes with respect to their mutual facing surface. Therefore, at the time when the vehicle is travelling, the air flowing along the outer surface 21a of the upper cover 21 and the air flowing along the outer surface 22a of the lower cover 22 are equal in flow speed. With the suppression of the difference in flow speed of the air around the housing 24, it is possible to effectively suppress the creation of turbulence behind the housing 24, to thereby reduce aerodynamic drag. Furthermore, it is also possible to prevent the unpleasant wind noise during travelling that is caused by the turbulence.

Furthermore, in the side mirror device 20 of the present embodiment, the engagement region E1 of the mirror base 27 is disposed between the upper cover 21 and the lower cover 22, and the engagement region E1 is caused to directly face the upper cover 21 and the lower cover 22. As a result, while the upper cover 21 and the lower cover 22 is kept in mirror-image symmetry with each other, it is possible to make the upper cover 21 and the lower cover 22 largest in size along the up-down direction H. For example, it is possible for them to be made large to approximately half the size of the housing 24. Therefore, it is possible to support a large mirror 26 excellent in visibility.

Furthermore, with the engagement region E1 of the mirror base 27 being caused to directly face the upper cover 21 and the lower cover 22, a sense of integratedness between the mirror 26 and the housing 24 improves, to thereby make it possible to actualize a side mirror device 20 excellent in design.

Furthermore, in the side mirror device 20 of the present embodiment, the inclinations of the outer surfaces 21a, 22a of the upper cover 21 and the lower cover 22 are formed so as to be closer to the horizontal direction as they are rearwardly farther away from the mirror base 27 along the travelling direction L of the vehicle 1. Therefore, it is possible to allow the travel wind to branch in the up-down direction H at the mirror base 27 in a further uniform manner. As a result, it is possible to more securely suppress the creation of turbulence behind the housing, to thereby reduce aerodynamic drag and unpleasant wind noise during travelling.

Furthermore, in the side mirror device 20 of the present embodiment, between the upper cover 21 and the lower cover 22, there is formed a center cover 23 that continuously extends outwardly from the engagement region E1 of the mirror base 27 along the vehicular width direction W, and the center cover 23 is disposed so as to be sandwiched between the upper cover 21 and the lower cover 22. Therefore, on the front side of the housing 24, it is possible to visually recognize the surface, from the outer surface 21*a* of the upper cover 21 to the outer surface 22*a* of the lower cover 22 via the surface of the center cover 23, as a stretch of continuous surface with little unevenness. As a result, it is possible to improve a sense of integratedness in the appearance of the housing 24, to thereby actualize a side mirror device 20 excellent in design.

Furthermore, in the side mirror device 20 of the present embodiment, with the engagement region E1 of the mirror base 27 and the center cover 23 being formed so as to have substantially the same width, at least in their mutual connection portion, along the up-down direction H of the vehicle 1, it is possible to form the lower end of the upper cover 21 and the upper end of the lower cover 22 in a linear shape. As a result, it is possible to prevent interference between the mirror base 27 and the center cover 23 that is caused by a positional displacement between the upper cover 21 and the lower cover 22 in the horizontal direction. Furthermore, it is possible to improve a sense of integratedness between the mirror base 27 and the center cover 23, to thereby actualize a side mirror device 20 excellent in design.

Furthermore, the side mirror device 20 of the present embodiment is provided with: an upper cover 21; a lower cover 22; and an internal housing 25 that is disposed in the internal space E2 surrounded by the center cover 23, wherein a predetermined gap E3 is kept between the internal housing 25 and the center cover 23, and wherein in the gap E3, connection members 32 are provided that connect between the internal housing 25 and at least one of the upper cover 21 and the lower cover 22.

This results in a structure in which at least one of the upper cover 21 and the lower cover 22 is engaged with the internal housing 25 not on the inner side(s) of the upper cover 21 and the lower cover 22 but on the inner side of the center cover 23. Therefore, it is possible to arrange the outer surfaces 21*a*, 22*a* of the upper cover 21 and the lower cover 22 closer to the internal housing 25.

As a result, it is possible to make the inclination angle on the front side, at which the outer surfaces 21*a*, 22*a* of the upper cover 21 and the lower cover 22 are in contact with the center cover 23, acuter (sharper angle). Therefore, it is possible to make the outline of the housing 25 compact, to thereby actualize a side mirror device 20 that is small and excellent in design.

Furthermore, in the side mirror device 20 of the preset embodiment, recess portions 21C, 22C are formed respectively in the outer circumferential edge portion of the upper cover 21 and the outer circumferential edge portion of the lower cover 22. With the recess portions 21C, 22C, the outer circumferential edge portion 25C of the internal housing 25 and the outer circumferential edge portion 23C of the center cover 23 are engaged. With this structure, it is possible to use the recess portions 21C, 22C, which are used for engaging the upper cover 21 and the lower cover 22 with the internal housing 25, also for engagement with the center cover 23. Therefore, it is possible to simplify the attachment structure, to thereby reduce the manufacturing costs of the side mirror device 20.

Furthermore, in the side mirror device 20 of the present embodiment, the click portions 23*p*1 that engage the internal housing 25 are formed on a vehicular-width-direction outer side end portion of the center cover 23. Furthermore, a vehicular-width-direction inner side end portion of the center cover 23 is engaged with the internal housing 25 via the engaging click 23*p*2.

As a result, even if in the assembly of the side mirror device 20, the outer circumferential edge portion 23C of the center cover 23 is in a state of not being inserted into the recess portions 21C, 22C of the upper cover 21 and the lower cover 22, it is possible to prevent the shakiness of the center cover 23, to thereby enhance the rigidity of the whole. Furthermore, because the center cover 23 is supported on both of the vehicular-width-direction outer side end portion and the vehicular-width-direction inner side end portion along the vehicular width direction W, it is possible to improve the supporting rigidity for the center cover 23.

Furthermore, in the side mirror device 20 of the present embodiment, with the outer side end portion of the center cover 23 in the vehicular width direction along the vehicular width direction W being brought into abutment with the abutment portion 25*e* of the internal housing 25, it is possible to prevent the displacement of the center cover 25 along the vehicular width direction W, to thereby improve the attachment workability of the upper cover 21 and the lower cover 22.

Furthermore, in the side mirror device 20 of the present embodiment, the cover 28 forms an opening edge portion 28*e* that rearwardly exposes the reflecting surface 26*a* of the mirror 26 on the rear side in the travelling direction L of the vehicle 1, and the opening edge portion 28*e* is made into involuted recess portions 21*h*, 22*h* which are formed by inwardly bending the rear-side end portions 21*e*2, 22*e*2 of the cover 28 toward the mirror 26. Into these involuted recess portions 21*h*, 22*h*, the rear-side end portion (abutment portion) 25*e* of the internal housing 25 is inserted to engage the rear-side end portions 21*e*2, 22*e*2 of the cover 28 with the rear-side end portion (abutment portion) 25*e* of the internal housing 25. As a result, to the outer surface of the side mirror device 20, a parting line, step, groove, or the like that is produced at the butting between the members will not be exposed.

Namely, in the present embodiment, an engagement portion between the rear-side end portions 21*e*2, 22*e*2 of the cover 28 and the rear-side end portion (abutment portion) 25*e* of the internal housing 25 is formed on the inner side of the cover 28, by the involuted recess portions 21*h*, 22*h*, that is unlikely to be visually recognized from outside.

Furthermore, this engagement portion is also hidden by the mirror 26 whose circumferential edge is surrounded by the involuted recess portions 21*h*, 22*h*. This prevent a parting line, step, groove, or the like of the engagement portion from being visually recognized from outside. Therefore, the side mirror device 20 of the present embodiment is excellent in a sense of integratedness when seen from outside and is capable of securing a sleek and excellent design.

Furthermore, because the engagement portion between the rear-side end portions 21*e*2, 22*e*2 of the cover 28 and the rear-side end portion (abutment portion) 25*e* of the internal housing 25 is not exposed to the outside surface side of the cover 28, the flow of air that is flowing along the outside surface side of the cover 28 at the time of travelling of the vehicle 1 will not be obstructed. This does not allow the side mirror device 20 to create turbulence at the time of travelling of the vehicle. Therefore, it is made possible to effectively suppress the creation of unpleasant wind noise.

Furthermore, in the side mirror device 20 of the present embodiment, the folded-back rear-side end portions 21*e*2, 22*e*2 of the cover 28 and the rear-side end portion (abutment portion) 25*e* of the internal housing 25 overlap each other in the involuted recess portions 21*h*, 22*h*. Accordingly, even if the rear-side end portions 21*e*2, 22*e*2 of the cover 28 and the rear-side end portion (abutment portion) 25*e* of the internal housing 25 are each reduced in thickness, required strength is ensured. Therefore, thinning of the thickness makes it possible to improve the molding characteristic.

Furthermore, in the side mirror device 20 of the present embodiment, the cover 28 is formed so as to have an outer surface with a shape that allows no undercut shape to be present from the involuted recess portions 21*h*, 22*h* formed on the rear side of the cover 28 toward the front side of the cover 28, namely, the cover 28 is formed so as to have an outer surface that does not include a component in the direction from the front side of the cover 28 toward the involuted recess portions 21*h*, 22*h*, which is reverse to the direction from the involuted recess portions 21*h*, 22*h* toward the front side of the cover 28. As a result, when formed, the cover 28 is molded with a slide-type mold. Then, only with an operation of sliding the mold, it is made possible to demold a molded cover 28 with ease.

FIG. 15 is a schematic diagram showing how an upper cover is molded by use of a mold. According to FIG. 15, when an upper cover (upper-portion cover) 21 is molded, a resin, which is a constituent material of the upper cover 21, is injected into a space that is formed in a mold 54 that is made of a cavity 51 and slide cores 52, 53, the space modelling an outline shape of the upper cover 21.

Then, after the resin is cooled, the cavity 51 is moved in the upward direction, and the slide core 52 is moved in the obliquely right down direction, and furthermore, the slide core 53 is moved in the lateral direction, to thereby allow the upper cover 21 to be demolded from the mold 54 with ease. Thus, with the mold 54 being only provided with the slide cores 52, 53 that demold the formation portion of the involuted recess portion 21*h*, it is made possible to demold the molded upper cover 21 with ease.

Namely, the outer surface of the upper cover 21 of the present embodiment is formed so as to extend from the involuted recess portion 21*h* toward the font side so that no undercut shape is present. Therefore, with slide cores being only provided in the location corresponding to the involuted recess portion 21*h*, it is possible to perform the demolding of the upper cover 21 with ease.

A mold for forming the lower cover 22 can be structured in the similar manner. As a result, it is possible to make the structure of the mold 54 simple, and hence, to manufacture the cover 28 at low cost and with ease.

Furthermore, in the side mirror device 20 of the present embodiment, the front-side end portions 21*e*2, 22*e*2 of the cover 28 in the travelling direction L are used as the frontmost portion of the contour of the side mirror device 20. As a result, it is possible to actualize an outer surface with a shape that allows no undercut shape to be present from the involuted recess portions 21*h*, 22*h* formed on the rear side of the cover 28 toward the front side of the cover 28. Then, it is possible to arrange the front-side end portions 21*e*2, 22*e*2 of the cover 28 in line with the contour (ridge line) of the outline shape of the side mirror device 20, and hence, to ensure a sleek and excellent design.

Furthermore, in the side mirror device 20 of the present embodiment, the cover 28 is made of: the upper cover 21 that covers an upper region than a center of the side mirror device 20 along the up-down direction, the center being the frontmost end of the cover 28; and a lower cover 22 that covers a lower region. As a result, it is possible to divide the cover 28 into two in the up-down direction H. Therefore, by use of the divided molds, it is made possible to perform the molding with further ease.

Furthermore, with the structure in which the rear-side end portion (abutment portion) 25*e* of the internal housing 25 being inserted into the involuted recess portions 21*h*, 22*h* that are formed of the rear-side end portion 21*e*2 of the upper cover 21 and the rear-side end portion 22*e*2 of the lower cover 22, it is possible to form a structure in which, over the whole circumference surrounding the mirror 26, the engagement portion between the cover 28 and the internal housing 25 is not allowed to be exposed to the outside.

Furthermore, the side mirror device 20 of the present embodiment is formed so that the rear-side side ends 21*e*2, 22*e*2 of the cover 28 constituting the involuted recess portions 21*h*, 22*h* are located behind the reflecting surface 26*a* of the mirror 26 in the travelling direction L. As a result, in attaching the upper cover 21 and the lower cover 22 in the assembly steps of the side mirror device 20, it is possible to suppress the interference with the mirror 26, and to further improve the assembly workability.

While an embodiment of the side mirror device of the present invention has been described above, the present invention is not limited to this, and optional modifications can be made without departing from the technical spirit of the invention.

For example, in the aforementioned embodiment, description has been for the structure in which the side mirror devices 20 are provided on the doors 10 of the vehicle, namely, for the door mirrors, by way of example. However, the present invention is applicable to a structure in which the side mirror devices 20 are provided on the front fenders of the vehicle, namely, to the fender mirrors.

Furthermore, for example, in the aforementioned embodiment, the pivoting device (bearing mechanism) 31 is formed on the upper side of the horizontal portion 27*b* of the mirror base 27 while the inclining mechanism 36 is formed on the lower side thereof. However, reversely to this, the present invention may have a structure in which the inclining mechanism 36 is disposed on the upper side of the horizontal portion 27*b* of the mirror base 27 while the pivoting device (bearing mechanism) 31 is disposed on the lower side thereof.

Furthermore, for example, in the aforementioned embodiment, the center cover 23 is provided between the upper cover 21 and the lower cover 22 that constitute the cover 28. However, without the center cover 23 being especially provided, the present invention may have a structure in which the outer circumferential edge portion of the upper cover 21 and the outer circumferential edge portion of the lower cover 22 are directly connected to each other. Furthermore, the whole of the cover 28 may be formed as an integral member.

Note that, in the aforementioned embodiment, as the vehicle 1 to which the side mirror device 20 is applied, a two-door car with an open roof in which a roof portion between the front pillar 3 and the rear pillar 4 is openable (convertible, cabriolet) is illustrated, by way of example. However, the vehicle 1 is not limited to the car with an open roof. The side mirror device 20 may be completely similarly applied to vehicles with various body shapes.

BRIEF DESCRIPTION OF THE REFERENCE SYMBOLS

1: Vehicle
2: Body

10: Door
20: Side mirror device
21: Upper cover
21a: Outer surface
21C, 22C: Recess portion
21e2, 22e2: End portion (side end)
21h, 22h: Involuted recess portion
22: Lower cover
22a: Outer surface
23: Center cover
23C: Outer circumferential edge portion
23p1: Click portion
23p2: Engaging click
24: Housing
25: Internal housing
25C: Outer circumferential edge portion
25e: Abutment portion (end portion)
26: Mirror
27: Mirror base
27a: Vertical portion
28: Cover
28e: Opening edge portion
29: Mirror holding recess portion
31: Pivoting device (bearing mechanism)
32: Connection member
36: Inclining mechanism
51: Inner cylindrical portion
52: Outer cylindrical portion
55: Engagement member
56: Spring
57: Spring shaft
59: Harness
E1: Engagement region
E3: Gap
H: Up-down direction
W: Vehicular width direction

The invention claimed is:

1. A side mirror device, comprising:
mirrors that are attached to outer surfaces on both sides of a vehicle along a vehicular width direction;
housings that hold the mirrors; and
mirror bases that couple the housings to the vehicle,
wherein the housing has an upper cover and a lower cover that are disposed so as to face each other, and
wherein shapes of outer surfaces of the upper cover and the lower cover form a mirror-image symmetry with each other.

2. The side mirror device according to claim 1,
wherein in the mirror base, an engagement region that is engaged with the housing is disposed between the upper cover and the lower cover, and
wherein in the mirror base, the engagement region directly faces the upper cover and the lower cover.

3. The side mirror device according to claim 2,
wherein the outer surfaces of the upper cover and the lower cover are formed in a shape that is further inclined toward a rear of the vehicle as it is farther away from the mirror base along an up-down direction of the vehicle.

4. The side mirror device according to claim 1,
wherein between the upper cover and the lower cover, a center cover is provided that outwardly extends continuously from the engagement region of the mirror base along the vehicular width direction, and
wherein the center cover is sandwiched between the upper cover and the lower cover.

5. The side mirror device according to claim 4, wherein the engagement region of the mirror base and the center cover are formed at least in a connection portion therebetween so as to have a substantially same width along an up-down direction of the vehicle.

6. The side mirror device according to claim 4,
wherein the housing comprises an internal housing that is disposed in an internal space surrounded by the upper cover, the lower cover, and the center cover,
wherein between the internal housing and the center cover, a predetermined gap is held, and
wherein in the gap, a connection member is disposed that connects between the internal housing and at least one of the upper cover and the lower cover.

7. The side mirror device according to claim 4, wherein in an outer circumferential edge portion of at least one of the upper cover and the lower cover, a recess portion is formed that is engageable with an outer circumferential edge portion of the internal housing and an outer circumferential edge portion of the center cover.

8. The side mirror device according to claim 7, wherein on a vehicular-width-direction outer end portion of the center cover, a click portion is formed that engages the internal housing.

9. The side mirror device according to claim 6, wherein on a vehicular-width-direction outer end portion of the internal housing, an abutment portion is provided that abuts the vehicular-width-direction outer end portion of the center cover.

10. The side mirror device according to claim 9, wherein a vehicular-width-direction inner end portion of the center cover is engaged with the internal housing via an engaging click.

* * * * *